(12) United States Patent
Dave et al.

(10) Patent No.: US 10,974,208 B2
(45) Date of Patent: Apr. 13, 2021

(54) GRAPHENE OXIDE MEMBRANES AND RELATED METHODS

(71) Applicant: Massachusetts Institute of Technology, Cambridge, MA (US)

(72) Inventors: Shreya H. Dave, Cambridge, MA (US);
Brent Keller, Somerville, MA (US);
Ggoch Ddeul Han, Cambridge, MA (US); Jeffrey C. Grossman, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 517 days.

(21) Appl. No.: 15/593,298

(22) Filed: May 11, 2017

(65) Prior Publication Data
US 2017/0341034 A1 Nov. 30, 2017

Related U.S. Application Data

(60) Provisional application No. 62/334,567, filed on May 11, 2016.

(51) Int. Cl.
*B01D 71/02* (2006.01)
*C01B 32/198* (2017.01)
(Continued)

(52) U.S. Cl.
CPC ....... *B01D 71/021* (2013.01); *B01D 67/0093* (2013.01); *B32B 3/26* (2013.01);
(Continued)

(58) Field of Classification Search
CPC .............. B01D 67/0093; B01D 71/021; B01D 71/024; B01D 2323/30; B32B 3/322;
(Continued)

(56) References Cited

U.S. PATENT DOCUMENTS

| 3,457,171 A | 7/1969 | Flowers et al. |
| 3,839,201 A | 10/1974 | Miller |

(Continued)

FOREIGN PATENT DOCUMENTS

| CN | 106064023 A1 | 11/2016 |
| DE | 102010001504 A1 | 8/2011 |

(Continued)

OTHER PUBLICATIONS

Hung et al: "Cross-Linking with Diamine Monomers to Prepare Composite Graphene Oxide-Framework Membranes with Varying d-Spacing", Chemistry of Materials, vol. 26, pp. 2983-2990 (2014).*

(Continued)

*Primary Examiner* — John Kim
(74) *Attorney, Agent, or Firm* — Wolf, Greenfield & Sacks, P.C.

(57) ABSTRACT

Membranes comprising graphene oxide sheets and associated filter media and methods are provided. In some embodiments, a membrane may comprise graphene oxide sheets that have undergone one or more chemical treatments. The chemical treatment(s) may impart beneficial properties to the membrane, such as a relatively small d-spacing, compatibility with a broad range of environments, physical stability, and charge neutrality. For example, the graphene oxide sheets may undergo one or more chemical treatments that form chemical linkages between at least a portion of the graphene oxide sheets in the membrane. Such chemical linkages may impart a small d-spacing, broad compatibility, and/or allow relatively thick membranes to be formed. In certain embodiments, the graphene oxide sheets may undergo one or more chemical treatment that imparts relative charge neutrality to the membrane by altering the ionizability of certain functional groups. Graphene oxide (Continued)

membranes, described herein, can be used for a wide range applications.

22 Claims, 17 Drawing Sheets

(51) Int. Cl.

| | |
|---|---|
| B32B 15/085 | (2006.01) |
| B01D 67/00 | (2006.01) |
| B32B 9/00 | (2006.01) |
| B32B 27/30 | (2006.01) |
| B32B 27/32 | (2006.01) |
| B32B 27/28 | (2006.01) |
| B32B 3/26 | (2006.01) |
| B32B 7/10 | (2006.01) |
| B32B 15/09 | (2006.01) |
| B32B 15/082 | (2006.01) |
| B32B 9/04 | (2006.01) |

(52) U.S. Cl.
CPC .............. *B32B 3/266* (2013.01); *B32B 7/10* (2013.01); *B32B 9/007* (2013.01); *B32B 9/041* (2013.01); *B32B 15/082* (2013.01); *B32B 15/085* (2013.01); *B32B 15/09* (2013.01); *B32B 27/283* (2013.01); *B32B 27/285* (2013.01); *B32B 27/286* (2013.01); *B32B 27/302* (2013.01); *B32B 27/304* (2013.01); *B32B 27/308* (2013.01); *B32B 27/32* (2013.01); *B32B 27/322* (2013.01); *C01B 32/198* (2017.08); *B01D 71/024* (2013.01); *B01D 2323/30* (2013.01); *B32B 2307/20* (2013.01); *B32B 2307/308* (2013.01); *B32B 2307/732* (2013.01); *B32B 2313/04* (2013.01)

(58) Field of Classification Search
CPC ..... B32B 15/09; B32B 15/085; B32B 15/082; B32B 9/041; B32B 9/007; B32B 7/10; B32B 2307/732; B32B 2307/308; B32B 2307/20; B32B 2313/04; B32B 3/26; B32B 3/266; B32B 27/322; B32B 27/32; B32B 27/308; B32B 27/304; B32B 27/302; B32B 27/286; B32B 27/285; B32B 27/283; C01B 32/198
See application file for complete search history.

(56) References Cited

U.S. PATENT DOCUMENTS

| | | | |
|---|---|---|---|
| 4,337,154 | A | 6/1982 | Fukuchi et al. |
| 4,767,422 | A | 8/1988 | Bikson et al. |
| 4,894,160 | A | 1/1990 | Abe et al. |
| 5,224,972 | A | 7/1993 | Frye et al. |
| 5,368,889 | A | 11/1994 | Johnson et al. |
| 6,117,341 | A | 9/2000 | Bray et al. |
| 6,730,145 | B1 | 8/2004 | Li |
| 8,361,321 | B2 | 1/2013 | Stetson et al. |
| 8,376,100 | B2 | 2/2013 | Avadhany et al. |
| 8,709,213 | B2 | 4/2014 | Compton et al. |
| 9,795,930 | B2 | 10/2017 | Lai et al. |
| 9,902,141 | B2 | 2/2018 | Mi et al. |
| 2002/0088748 | A1 | 7/2002 | Allcock et al. |
| 2003/0185741 | A1 | 10/2003 | Matyjaszewski et al. |
| 2006/0201884 | A1 | 9/2006 | Kulprathipanja et al. |
| 2007/0017861 | A1 | 1/2007 | Foley et al. |
| 2008/0020197 | A1 | 1/2008 | Ayers et al. |
| 2008/0149561 | A1 | 6/2008 | Chu et al. |
| 2009/0000651 | A1 | 1/2009 | Qiao |
| 2009/0120874 | A1 | 5/2009 | Jensen et al. |
| 2009/0155678 | A1 | 6/2009 | Less et al. |
| 2011/0056892 | A1 | 3/2011 | Strauss et al. |
| 2011/0108521 | A1 | 5/2011 | Woo et al. |
| 2011/0133134 | A1 | 6/2011 | Varma et al. |
| 2011/0139707 | A1 | 6/2011 | Siwy et al. |
| 2011/0186786 | A1 | 8/2011 | Scheffer et al. |
| 2011/0189452 | A1 | 8/2011 | Lettow et al. |
| 2011/0223494 | A1 | 9/2011 | Feaver et al. |
| 2012/0000845 | A1 | 1/2012 | Park et al. |
| 2012/0048804 | A1 | 3/2012 | Stetson et al. |
| 2012/0108418 | A1 | 5/2012 | Nair et al. |
| 2012/0171376 | A1 | 7/2012 | Dodge |
| 2012/0186980 | A1 | 7/2012 | Mishra et al. |
| 2012/0255899 | A1 | 10/2012 | Choi et al. |
| 2012/0295091 | A1 | 11/2012 | Behabtu et al. |
| 2013/0040283 | A1 | 2/2013 | Star et al. |
| 2013/0105417 | A1 | 5/2013 | Stetson et al. |
| 2013/0192460 | A1 | 8/2013 | Miller et al. |
| 2013/0270188 | A1 | 10/2013 | Karnik et al. |
| 2013/0305927 | A1 | 11/2013 | Choi et al. |
| 2013/0309776 | A1 | 11/2013 | Drndic et al. |
| 2013/0314844 | A1 | 11/2013 | Chen et al. |
| 2014/0030482 | A1 | 1/2014 | Miller et al. |
| 2014/0138314 | A1 | 5/2014 | Liu et al. |
| 2014/0199777 | A2 | 7/2014 | Ruiz et al. |
| 2014/0262820 | A1 | 9/2014 | Kuan et al. |
| 2014/0272286 | A1 | 9/2014 | Stoltenberg et al. |
| 2014/0311967 | A1 | 10/2014 | Grossman et al. |
| 2014/0332814 | A1 | 11/2014 | Peng et al. |
| 2014/0374267 | A1 | 12/2014 | Monteiro et al. |
| 2015/0010714 | A1 | 1/2015 | Appleton et al. |
| 2015/0122727 | A1 | 5/2015 | Karnik et al. |
| 2015/0224451 | A1 | 8/2015 | Miyahara et al. |
| 2015/0258506 | A1 | 9/2015 | Mi et al. |
| 2015/0273401 | A1 | 10/2015 | Miller et al. |
| 2016/0009049 | A1 | 1/2016 | Stoltenberg et al. |
| 2016/0051942 | A1 | 2/2016 | Park et al. |
| 2017/0021366 | A1 | 1/2017 | Chapman et al. |
| 2017/0154975 | A1 | 6/2017 | Liu et al. |
| 2017/0368508 | A1 | 12/2017 | Grossman et al. |
| 2018/0001267 | A1 | 1/2018 | Lee et al. |
| 2019/0283388 | A1 | 9/2019 | Mi et al. |

FOREIGN PATENT DOCUMENTS

| | | |
|---|---|---|
| EP | 2 511 002 A1 | 10/2012 |
| WO | WO 2010/030382 A1 | 3/2010 |
| WO | WO 2010/043914 A2 | 4/2010 |
| WO | WO 2010/126686 A2 | 11/2010 |
| WO | WO 2015/075451 A1 | 5/2015 |
| WO | WO 2016/011124 A1 | 1/2016 |
| WO | WO 2016/189320 A1 | 12/2016 |
| WO | WO 2017/106540 A1 | 6/2017 |
| WO | WO 2017/201482 A1 | 11/2017 |
| WO | WO 2018/067269 A1 | 4/2018 |
| WO | WO 2018/160871 A2 | 9/2018 |
| WO | WO 2019/028280 A1 | 2/2019 |

OTHER PUBLICATIONS

International Search Report and Written Opinion dated Jul. 31, 2017 for Application No. PCT/US2017/032297.
An et al., Separation performance of graphene oxide in aqueous solution. I&EC Research. Apr. 8, 2016;55:4803-10.
Abraham et al., Tunable sieving of ions using graphene oxide membranes. Nat Nanotechnol. Epub Apr. 3, 2017;1-6.
Bourlinos et al., Graphite oxide: Chemical reduction to graphite and surface modification with primary aliphatic amines and amino acids. Langmuir. Jul. 2003;19(15):6050-5.
Burress et al., Graphene oxide framework materials: Theoretical predictions and experimental results. Ang Chem Intl Ed. Oct. 2010;49(47):8902-4.
Cohen-Tanugi et al., Mechanical strength of nanoporous graphene as a desalination membrane. Nano Lett. Oct. 30, 2014;14:6171-8.
Dave, Assessing Graphene Oxide for Water Desalination Applications. PhD Thesis. Submitted to the Department of Mechanical Engineering, Massachusetts Institute of Technology. Jun. 2016. 134 pages.

(56) References Cited

OTHER PUBLICATIONS

Fang et al., Constructing hierarchically structured interphases for strong and tough epoxy nanocomposites by amine-rich graphene surfaces. J Mater Chem. Nov. 2010;20(43):9635-43.
Georgakilas et al., Functionalization of graphene: Covalent and non-covalent approaches, derivatives and applications. Chem Rev. Nov. 2012;112(11):6156-6214. Epub Sep. 25, 2012.
Han et al., Ultrathin graphene nanofiltration membrane for water purification. Adv Funct Mater. Feb. 2013;23(29):3693-3700.
Herrera-Alonso et al., Intercalation and stitching of graphite oxide with diaminoalkanes. Langmuir. Oct. 2007;23(21):10644-9. Epub Sep. 7, 2007.
Hu et al., Enabling graphene oxide nanosheets as water separation membranes. Env Sci & Technol. Apr. 2013;47(8):3715-23. Epub Mar. 14, 2013.
Huang et al., Graphene-based membranes for molecular separation. J Phys Chem Lett. Jul. 2015;6(14):2806-15. Epub Jun. 24, 2015.
Hung et al., Cross-linking with diamine monomers to prepare composite graphene oxide-framework membranes with varying d-spacing. Chem Mater. May 2014;26(9):2983-90.
Jia et al., Dicarboxylic acids crosslinked graphene oxide membranes for salt solution permeation. Colloids Surf A: Physicochem Eng Aspects. Apr. 2016;494:101-7. Epub Jan. 19, 2016.
Joshi et al., Graphene oxide: The new membrane material. Appl Mater Today. Nov. 2015;1(1):1-12.
Joshi et al., Precise and ultrafast molecular sieving through graphene oxide membranes. Science. Feb. 14, 2014;343:752-4.
Karousis et al., Graphene oxide with covalently linked porphyrin antennae: Synthesis, characterization and photophysical properties. J Mater Chem. 2011;21(1):109-17. Epub Oct. 4, 2010.
Mattevi et al., Evolution of electrical, chemical, and structural properties of transparent and conducting chemically derived graphene thin films. Adv Funct Mater. Aug. 2009;19(16):2577-83.
Miller et al., Ring-closing metathesis as a new methodology for the synthesis of monomeric flavonoids and neoflavonoids. Tetrahedron Lett. Aug. 2012;53(35):4708-10. Epub Jun. 28, 2012.
Nair et al., Unimpeded permeation of water through helium-leak-tight graphene-based membranes. Science. Jan. 27, 2012;335(6067):442-4.
Okazoe et al., Alkylidenation of ester carbonyl groups by means of a reagent derived from RCHBr2, Zn, TiCl4, and TMEDA. Stereoselective preparation of (Z)-alkenyl ethers. J Org Chem. Aug. 1987;52(19):4410-2.
Park et al., Covalent functionalization of graphene with reactive intermediates. Accts of Chem Research. Jan. 2013;46(1):181-9. Epub Nov. 1, 2012.
Pine et al., Ketone methylenation using the Tebbe and Wittig reagents—A comparison. Synthesis. Feb. 1991;1991(2):165-7.
Srinivas et al., Porous graphene oxide frameworks: Synthesis and gas sorption properties. J Mater Chem. 2011;21(30):11323-9. Epub Jun. 23, 2011.
Suk et al., Molecular and continuum hydrodynamics in graphene nanopores. RSC Adv. 2013;3:9365-72.
Sun et al., Laminar MoS2 membranes for molecule separation. Chem Commun. Oct. 2013;49(91):10718-20.
Surwade et al., Water desalination using nanoporous single-layer graphene. Nat Nanotechnol. Mar. 23, 2015;1-6.
Xia et al., Ultrathin graphene oxide nanosheet membranes with various d-spacing assembled using the pressure-assisted filtration method for removing natural organic matter. Desalination. Sep. 2015;371:78-87. Epub Jun. 11, 2015.
Yeh et al., On the origin of the stability of graphene oxide membranes in water. Nat Chem. Feb. 2015;7(2):166-70. Epub Jan. 5, 2015.
International Search Report and Written Opinion dated Jul. 28, 2014 for International Application No. PCT/US2014/027309.
International Search Report and Written Opinion dated Jun. 11, 2013 for International Application No. PCT/US2013/031963.
Invitation to Pay Additional Fees mailed Jan. 28, 2015 for International Application No. PCT/US2014/063301.

International Search Report and Written Opinion dated Mar. 20, 2015 for International Application No. PCT/US2014/063301.
Aleman et al., Transfer-Free Batch Fabrication of Large-Area Suspended Graphene Membranes. ACS Nano, 4(8):4762-4768 (2010).
Allen et al., Honeycomb carbon: a review of graphene. Chem Rev., 110(1):132-145 (2010); doi:10.1021/cr900070d.
Apel, Invited Talk. Track etching technique in membrane technology. Radiational Measurements, 34:559-566 (2001).
Bagri et al., Structural evolution during the reduction of chemically derived graphene oxide. Nat. Chem, 2:581-587 (2010).
Boukai et al., Efficiency enhancement of copper contaminated radial p-n junction solar cells. Chem Phys Lett., 501:153-158 (2011).
Boutilier et al., Implications of Permeation Through Intrinsic Defects in Graphene on the Design of Defect-Tolerant Membranes for Gas Separation. ACS Nano, 891:841-849 (2014).
Bowden, A perspective on resist materials for fine line lithography. Materials for Microlithography, Advances in Chemistry Series, #266, American Chemical Society, Washington, D.C., 1984, Chapter 3:39-117.
Buffle et al., Metal flux and dynamic speciation at (bio)interfaces. Part 1: Critical evaluation and compilation of physicochemical parameters for complexes with simple ligands and fulvic/humic substances. Environmental Science & Technology, 41(22):7609-7620 (2007).
Cath et al., Forward osmosis: Principles, applications, and recent developments. Journal of Membrane Science, 281(1-2):70-87 (2006).
Chang et al., Densely packed arrays of ultra-high-aspect-ratio silicon nanowires fabricated using block-copolymer lithography and metal-assisted etching. Adv Funct Mater., 19:2495-2500 (2009).
Choi et al., Layer-by-Layer assembly of graphene oxide nanosheets on polyamide membranes for durable reverse-osmosis applications. ACS Appl. Mater. Interfaces, 5(23):12510-12519 (2013).
Chowdhury et al., Fullerenic nanostructures in flames. J Mater Res., 11:341-347 (1996).
Chu, Plugging up leaky graphene. MIT News Office, May 8, 2015, pp. 1-3; Available at http://news.mit.edu/2015/repair-graphene-leaks-0508.
Chung et al., Emerging forward osmosis (fo) technologies and challenges ahead for clean water and clean energy applications. Current Opinion in Chemical Engineering, 1(3):246-257 (2012).
Cohen-Tanugi et al., Water desalination across nanoporous graphene. Nano Lett., 12(7):3602-3608 (2012).
Cohen-Tanugi et al., Quantifying the potential of ultra-permeable membranes for water desalination. Energy & Environmental Science, 7:1134-1141 (2014).
Decher & Schmitt, Fine-tuning of the film thickness of ultrathin multilayer films composed of consecutively alternating layers of anionic and cationic polyelectrolytes. In Trends in Colloid and Interface Science VI, Springer, 1992, pp. 160-164.
Decher, Fuzzy nanoassemblies—toward layered polymeric multicomposites. Science, 277:1232-1237 (1997).
Deng et al., Developments and new applications of UV-induced surface graft polymerizations. Progress in Polymer Science, 34(2):156-193 (2009).
Dikin et al., Preparation and characterization of graphene oxide paper. Nature, 448(7152):457-460 (2007).
Dreyer et al., The chemistry of graphene oxide. Chem Soc Rev, 39(1):228-240 (2010).
Du et al., Separation of Hydrogen and Nitrogen Gases with Porous Graphene Membrane. J of Physical Chemistry, 115:23261-23266 (2011).
Dubas et al., Polyelectrolyte multilayers containing a weak polyacid: construction and deconstruction. Macromolecules, 34(11):3736-3740 (2001).
Erickson et al., Determination of the local chemical structure of graphene oxide and reduced graphene oxide. Adv Mater., 22:4467-4472 (2010).
Fang et al., Modification of polyethersulfone membrane by grafting bovine serum albumin on the surface of polyethersulfone/poly(acrylonitrile-co-acrylic acid) blended membrane. Journal of Membrane Science, 329:46-55 (2009).
Fang et al., Pore size control of ultrathin silicon membranes by rapid thermal carbonization. Nano Lett., 10:3904-3908 (2010).

(56) References Cited

OTHER PUBLICATIONS

Fischbein et al., Electron beam nanosculpting of suspended graphene sheets. Applied Physics Letters, 93:113107 (2008); https://doi.org/10.1063/1.2980518.

Goel et al., Size analysis of single fullerene molecules by electron microscopy. J Carbon, 42:1907-1915 (2004).

Grantab et al., Anomalous strength characteristics of tilt grain boundaries in graphene. Science, 330(6006):946-948 (2010).

Hammond, Recent explorations in electrostatic multilayer thin film assembly. Current Opinion in Colloid & Interface Science, 4(6):430-442 (1999).

Henis et al., Composite hollow fiber membranes for gas separation: the resistance model approach. Journal of Membrane Science, 8:233-246 (1981).

Huang et al., Ultrafast viscous water flow through nanostrand-channelled graphene oxide membranes. Nat Commun., 4:2979 (2013); doi: 10.1038/ncomms3979.

Hummers & Offerman, Preparation of graphitic oxide. Journal of the American Chemical Society, 80(6):1339-1339 (1958).

Jiang et al., Porous Graphene as the Ultimate Membrane for Gas Separation. Nano Letters, 9(12):4019-4024 (2009).

Jin et al., Use of polyelectrolyte layer-by-layer assemblies as nanofiltration and reverse osmosis membranes. Langmuir, 19(7):2550-2553 (2003).

Kannam et al., Interfacial slip friction at a fluid-solid cylindrical boundary. The Journal of Chemical Physics, 136(24):244704; doi:10.1063/1.4730167, (2012).

Kemmell et al., Transparent superhydrophobic surfaces by self-assembly of hydrophobic monolayers on nanostructured surfaces. Phys Stat Sol (a), 203:1453-1458 (2006).

Kim et al., Applications of atomic layer deposition to nanofabrication and emerging nanodevices. Thin Solid Films, 517:2563-2580 (2009).

Kim et al., Fabrication and Characterization of Large-Area, Semiconducting Nanoperforated Graphene Materials. Nano Letters, 10:1125-1131 (2010); doi:10.1021/n19032318.

Kim et al., Selective gas transport through few-layered graphene and graphene oxide membranes. Science, 342:91-94 (2013).

Koenig et al., Selective Molecular Sieving Through Porous Graphene. Nature NanoTechnology, 7:728-732 (2012).

Kotov et al., Ultrathin graphite oxide-polyelectrolyte composites prepared by self-assembly: Transition between conductive and non-conductive states. Advanced Materials, 8(8):637-641 (1996).

Kovtyukhova et al., Layer-by-layer assembly of ultrathin composite films from micron-sized graphite oxide sheets and polycations. Chemistry of Materials, 11(3):771-778 (1999).

Krasemann et al., Self-assembled polyelectrolyte multilayer membranes with highly improved pervaporation separation of ethanol/water mixtures. Journal of Membrane Science, 181(2):221-228 (2001).

Lee et al., Measurement of the elastic properties and intrinsic strength of monolayer graphene. Science, 321(5887):385-388 (2008).

Li et al., Ultrathin, molecular-sieving graphene oxide membranes for selective hydrogen separation. Science, 342:95-98 (2013).

Li et al., Processable aqueous dispersions of graphene nanosheets. Nature Nanotechnology, 3(2):101-105 (2008).

Liu et al., Graphene facilitated visible light photodegradation of methylene blue over titanium dioxide photocatalysts. Chem Eng J, 214:298-303 (2013).

Liu et al., Two-Dimensional-Material Membranes: A New Family of High-Performance Separation Membranes. Angew Chem Int Ed Engl., 55(43):13384-13397 (2016); doi:10.1002/anie.201600438. Epub Jul. 1, 2016.

Lehtinen et al., Effects of Ion Bombardment on a Two-Dimensional Target: Atomistic Simulations of Graphene Irradiation. Physical Review B, 81:153401.01-153401.04 (2010).

Lerf et al., Hydration behavior and dynamics of water molecules in graphite oxide. J Phys Chem Sol., 67:1106-1110 (2006).

Malaisamy et al., High-flux nanofiltration membranes prepared by adsorption of multilayer polyelectrolyte membranes on polymeric supports. Langmuir, 21:10587-10592 (2005).

Marcano et al., Improved synthesis of graphene oxide. ACS Nano, 4(8):4806-4814 (2010).

McGinnis et al., Global challenges in energy and water supply: The promise of engineered osmosis. Environmental Science & Technology, 42(23):8625-8629 (2008).

Mi et al., Organic fouling of forward osmosis membranes: Fouling reversibility and cleaning without chemical reagents. Journal of Membrane Science, 348(1-2):337-345 (2010).

Mi, Graphene Oxide Membranes for Ionic and Molecular Sieving. Science, 343:740-742 (2014).

Miller et al., Mutual diffusion coefficients and ionic transport coefficients lij of magnesium chloride-water at 25.degree.C. The Journal of Physical Chemistry, 88(23):5739-5748 (1984).

Min et al., Mechanical properties of graphene under shear deformation. Applied Physics Letters, 98(1):013113 (2011); https://doi.org/10.1063/1.3534787.

Mooney et al., Simulation studies for liquid phenol: properties evaluated and tested over a range of temperatures. Chem Phys Lett., 294:135-142 (1998).

Nyyssonen, Optical linewidth measurement on patterned wafers. SPIE Proceedings, Integrated Circuit Metrology, 480:65 (1984).

O'Hern et al., Selective molecular transport through intrinsic defects in a single layer of CVD graphene. ACS Nano, 6(11):10130-10138 (2012).

Ouyang et al., Multilayer polyelectrolyte films as nanofiltration membranes for separating monovalent and divalent cations. Journal of Membrane Science, 310(1-2):76-84 (2008).

Pendergast et al., A review of water treatment membrane nanotechnologies. Energy Environ Sci., 4:1946-1971 (2011).

Perrault et al., Thin-Film Composite Polyamide Membranes Functionalized with Biocidal Graphene Oxide Nanosheets. Environ. Sci. Technol. Lett., 1(1):71-76 (2014).

Perry et al., Reliable, bench-top measurements of charge density in the active layers of thin-film composite and nanocomposite membranes using quartz crystal microbalance technology. Journal of Membrane Science, 429:23-33 (2013).

Prabhu et al., SEM-induced shrinking of solid-state nanopores for single molecule detection. Nanotech., 22:425302-425311 (2011).

Qiu et al., Controllable corrugation of chemically converted graphene sheets in water and potential application for nanofiltration. Chem Commun, 47(20):5810-5812 (2011).

Qiu et al., Synthesis of high flux forward osmosis membranes by chemically crosslinked layer-by-layer polyelectrolytes. Journal of Membrane Science, 381(1-2):74-80 (2011).

Russo et al., Atom-By-Atom Nucleation and Growth of Graphene Nanopores. PNAS, 109(16):5953-5957 (2012).

Saren et al., Synthesis and characterization of novel forward osmosis membranes based on layer-by-layer assembly. Environmental Science & Technology, 45(12):5201-5208 (2011).

Schrier, Carbon dioxide separation with a two-dimensional polymer membrane. ACS Appl Mater Interfaces, 47):3745-3752 (2012).

Shiratori et al., Ph-dependent thickness behavior of sequentially adsorbed layers of weak polyelectrolytes. Macromolecules, 33(11):4213-4219 (2000).

Singh et al., Modification of regenerated cellulose ultrafiltration membranes by surface-initiated atom transfer radical polymerization. Journal of Membrane Science, 311:225-234 (2008).

Sint et al., Selective ion passage through functionalized graphene nanopores. J am Chem Soc., 130(49):16448-16449 (2008).

Stanton et al., Ultrathin, multilayered polyelectrolyte films as nanofiltration membranes. Langmuir, 19(17):7038-7042 (2003).

Storm et al., Fabrication of solid-state nanopores with single-nanometre precision. Nat Mater Lett., 2:537-540 (2003).

Suess, Abundances of the elements, Reviews of Modern Physics. 18:53-74 (1956).

Suk et al., Water transport through ultrathin graphene. J. Phys. Chem. Lett., 1:1590-1594 (2010).

Sun et al., Selective ion penetration of graphene oxide membranes. ACS Nano., 7(1):428-437 (2013).

(56) References Cited

OTHER PUBLICATIONS

Szabo et al., Evolution of surface functional groups in a series of progressively oxidized graphite oxides. Chemistry of Materials, 18(11):2740-2749 (2006).
Taffa et al., Pore size and surface charge control in mesoporous TiO2 using post-grafted SAMs. Phys Chem Chem Phys., 12:1473-1482 (2010).
Tiraferri et al., Relating performance of thin-film composite forward osmosis membranes to support layer formation and structure. Journal of Membrane Science, 367(1-2):340-352 (2011).
Ulman, A., Formation and Structure of Self-Assembled Monolayers. Chem. Rev., 96(4):1533-1554 (1996).
Van Den Haut et al., Controlling nanopore size, shape and stability. Nanotech., 21:115304-115309 (2010).
Wang et al., Characterization of novel forward osmosis hollow fiber membranes. Journal of Membrane Science, 355(1):158-167 (2010).
Yip et al., High performance thin-film composite forward osmosis membrane. Environmental Science & Technology, 44(10):3812-3818 (2010).
Yip et al., Thin-film composite pressure retarded osmosis membranes for sustainable power generation from salinity gradients. Environmental Science & Technology, 45(10):4360-4369 (2011).
Yoon et al., Graphene-based membranes: status and prospects. Phil. Trans. R. Soc. A, 374: 20150024 (2016); doi:10.1098/rsta.2015.0024.
Zangmeister et al., Restructuring of graphene oxide sheets into monodisperse nanospheres. Chemistry of Materials, 24(13):2554-2557 (2012).
Zhang et al., Self-assembly of polyelectrolyte multilayer pervaporation membranes by a dynamic layer-by-layer technique on a hydrolyzed polyacrylonitrile ultrafiltration membrane. Journal of Membrane Science, 292(1-2):1-8 (2007).
Zhao et al., Recent developments in forward osmosis: Opportunities and challenges. Journal of Membrane Science, 396(0):1-21 (2012).
Zhu et al., Surface modification of PVDF porous membranes via poly(DOPA) coating and heparin immobilization. Colloids Surf B Biointerfaces, 69(1):152-155 (2009); doi:10.1016/j.colsurfb.2008.11.011. Epub Nov. 25, 2008.
Zhou et al., Surface modification of thin film composite polyamide membranes by electrostatic self deposition of polycations for improved fouling resistance. Separation and Purification Technology, 66(2):287-294 (2009).
International Preliminary Report on Patentability dated Nov. 22, 2018 for International Application No. PCT/US2017/032297.
Extended European Search Report dated Nov. 29, 2019 for Application No. 17796896.3.
Hung et al., Cross-linking with diamine monomers to prepare composite graphene oxide-framework membranes with varying d-spacing. Chem Mater. Apr. 1, 2014;26:2983-2990.
Jia et al., Covalently crosslinked graphene oxide membranes by esterification reactions for ions separation. J Mater Chem. Feb. 28, 2015;3(8):4405-4412.
Xia et al., Ultrathin graphene oxide nanosheet membranes with various d-spacing assembled using the pressure-assisted filtration method for removing natural organix matter. Desalination. Jun. 11, 2015;371:78-87.

\* cited by examiner

GRAPHENE OXIDE MEMBRANES AND RELATED METHODS

RELATED APPLICATIONS

This application claims priority under 35 U.S.C. § 119(e) to U.S. Provisional Patent Application Ser. No. 62/334,567, filed May 11, 2016, and entitled "Cross-linked Graphene Oxide Films for Separation Processes," which is incorporated herein by reference in its entirety for all purposes.

TECHNICAL FIELD

The present embodiments relate generally to graphene oxide membranes, and specifically, to graphene oxide membranes for separation processes.

BACKGROUND

Membranes provide a barrier, partial or complete, to solids, liquids, and/or gases. Semipermeable membranes allow certain molecules (e.g., permeates) to pass through while restricting the passage of other molecules (e.g., retentates). Recently, research has focused on the use of semipermeable membranes for ultrafiltration (UF) and nanofiltration (NF). Ultrafiltration membranes are used to separate higher molecular weight molecules, such as proteins, from lower molecular weight molecules, such as salts. Ultrafiltration membranes are often used to concentrate molecules, desalt solutions, exchange buffers, and/or fractionate molecules. Nanofiltration membranes have a smaller molecular weight cutoff (i.e., the lowest molecular weight that at least 90% of a molecule is retained by the membrane) than ultrafiltration membranes. Accordingly, nanofiltration membranes are often used to separate molecules having a relatively low molecular weight, such as the separation of divalent ions (e.g., calcium, magnesium) from smaller hydrated monovalent ions (e.g., sodium). Despite their utility, many existing ultrafiltration and nanofiltration membranes have technical or economical limitations that hamper their use. For instance, many ultrafiltration and nanofiltration membranes are costly to manufacture and/or maintain, require complex and/or time consuming manufacturing techniques, and are not suitable for use in a wide range of chemical environments.

SUMMARY

Membranes comprising graphene oxide sheets and associated filter media and methods are provided. The subject matter of this application involves, in some cases, interrelated products, alternative solutions to a particular problem, and/or a plurality of different uses of structures and compositions.

In one set of embodiments, membranes are provided. In one embodiment, a membrane comprises crosslinked graphene oxide sheets, wherein a thickness of the membrane is greater than or equal to about 0.2 microns and a weight percentage of graphene oxide in the membrane is greater than or equal to about 70 wt. %.

In another embodiment, a membrane comprises graphene oxide sheets, wherein the magnitude of the zeta potential of the membrane is less than or equal to about 9 mV at pH 7.

In one embodiment, a membrane comprises covalently crosslinked graphene oxide sheets, wherein an average d-spacing of the membrane when saturated with water is less than or equal to about 9 Å.

In another embodiment, a membrane comprises a first graphene oxide sheet, a second graphene oxide sheet, and a chemical linkage that attaches the first graphene oxide sheet to the second graphene oxide sheet, wherein the chemical linkage comprises an ether group.

In one embodiment, a membrane comprises a first graphene oxide sheet, a second graphene oxide sheet, and a chemical linkage that attaches the first graphene oxide sheet to the second graphene oxide sheet, wherein the chemical linkage is of Formula I:

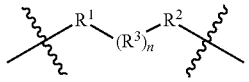

wherein:
$R^1$ is —C(O)—, —C(O)$_2$—, —O—, —S—, —N(R')—, —C(R')$_2$—, —C(=R')—, or a bond;
$R^2$ is —C(O)—, —C(O)$_2$—, —O—, —S—, —N(R')—, —C(R')$_2$—, or —C(=R')$_2$—, or a bond;
each $R^3$ is independently a bond, —O— or —N(R')—;
each R' is independently hydrogen, halide, hydroxyl, amine, or optionally substituted alkyl;
n is 1-5; and ⸺ indicates attachment to the backbone of a graphene oxide sheet.

In another set of embodiments, filter media are provided. In one embodiment, a filter media comprises a membrane comprising crosslinked graphene oxide sheets, wherein the membrane has an average d-spacing of less than or equal to about 12 Å when saturated with water and wherein the filter media has a maximum compatible pH of greater than or equal to about 8 and/or a minimum compatible pH of less than or equal to about 5.

In another embodiment, a filter media comprises a membrane comprising crosslinked graphene oxide sheets, wherein an average d-spacing of the membrane when saturated with water is less than or equal to about 12 Å and a maximum operating temperature of the filter media in water at pH 7 is greater than or equal to about 65° C. and less than or equal to about 300° C.

In one embodiment, a filter media comprises a membrane comprising crosslinked graphene oxide sheets, wherein an average d-spacing of the membrane when saturated with water is less than or equal to about 12 Å and wherein the filter media is compatible with one or more oxidizing agents.

In one set of embodiments, methods are provided. In one embodiment, a method comprises converting a first functional group on a first graphene oxide sheet to an activated functional group via a functional group interconversion reaction, and reacting the activated functional group with a second functional group on a second graphene oxide sheet to form a chemical linkage between the first graphene oxide sheet and the second graphene oxide sheet.

In another embodiment, a method comprises activating a chemical moiety on a first graphene oxide sheet, and reacting the chemical moiety with a second functional group on a second graphene oxide sheet to form a chemical linkage between the first graphene oxide sheet and the second graphene oxide sheet.

In one embodiment, a method comprises exposing a membrane comprising a first graphene oxide sheet, a second graphene oxide sheet, and a first chemical linkage that attaches the first graphene oxide sheet to the second graphene oxide sheet to functional group interconversion reaction conditions, and converting the first chemical linkage into a second chemical linkage, wherein the second chemical linkage attaches the first graphene oxide sheet to the second graphene oxide sheet and a chemical structure of the second chemical linkage is different than a chemical structure of the first chemical linkage.

In another embodiment, a method comprises a method comprises providing a first graphene oxide sheet comprising first ionizable functional groups and a second graphene oxide sheet; converting at least a portion of the first ionizable functional groups into first non-ionizable groups; and forming a membrane comprising the first graphene oxide sheet and the second graphene oxide sheet, wherein a magnitude of a zeta potential of the membrane after the converting step is less a magnitude of a zeta potential of the membrane prior to the converting step.

In one embodiment, a method of forming a membrane comprises providing a mixture comprising graphene oxide sheets and a fluid, removing at least a portion of the fluid from the mixture, and during the removing step, crosslinking at least a portion of the graphene oxide sheets.

In another embodiment, a method comprises contacting a membrane comprising crosslinked graphene oxide sheets with a mixture comprising a fluid, a first species having a molecular weight of greater than or equal to about 250 g/mol, and a second species having a molecular weight of less than about 250 g/mol, and passing the fluid and the second species through the membrane, wherein at least a portion of the first species is rejected by the membrane.

In one embodiment, a method comprises a comprises contacting a membrane comprising crosslinked graphene oxide sheets with a mixture comprising a fluid, an organic species, and an inorganic species having a net charge, and passing the fluid and the inorganic species through the membrane, wherein at least a portion of the first species is rejected by the membrane.

In another set of embodiments, porous materials are provided. In one embodiment, a porous material comprises crosslinked graphene oxide sheets, wherein the porous material has an average pore size of greater than or equal to about 0.002 microns and the weight percentage of graphene oxide in the porous material is greater than or equal to about 70 wt. %.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Membranes comprising graphene oxide sheets and associated filter media and methods are provided. In some embodiments, a membrane may comprise graphene oxide sheets that have undergone one or more chemical treatments (e.g., chemical reactions). The chemical treatment(s) may impart beneficial properties to the membrane, such as a relatively small d-spacing (e.g., solvent saturated, dry), compatibility with a broad range of environments (e.g., low pH, high pH, non-aqueous solvent, chlorinated solvent, oxidizing, high temperature), physical stability, and charge neutrality. For example, the graphene oxide sheets may undergo one or more chemical treatments that form chemical linkages (e.g., having a desirable structure and/or length) between at least a portion of the graphene oxide sheets in the membrane. Such chemical linkages may impart a small d-spacing, broad compatibility, and/or allow relatively thick membranes (e.g., free-standing membranes) to be formed. In certain embodiments, the graphene oxide sheets may undergo one or more chemical treatments that impart relative charge neutrality to the membrane by altering the ionizability of certain functional groups on the graphene oxide sheets. Graphene oxide membranes, described herein, can be used for a wide range of ultrafiltration and nanofiltration applications, including concentration of molecules (e.g., whey, lactose), desalting (e.g., lactose, dye, chemicals, pharmaceuticals), fractionation (e.g., sugars), extraction (e.g., nutraceuticals, plant oils), recovery (e.g., black liquor, catalyst, solvent), and purification (e.g., pharmaceutical, chemical, fuel).

Many existing ultrafiltration and nanofiltration membranes have limited operating conditions. In general, most ultrafiltration and nanofiltration membranes are made of polymers or ceramic materials that each has inherent chemical, physical, and/or thermal limitations that restrict the utility of the membrane to certain applications. Thus, membrane selection for ultrafiltration and nanofiltration focuses on the selection of economical membrane materials that can retain the desired molecule(s) with a suitable flux (i.e., permeate rate per unit area of the membrane) while having the requisite chemical, physical, thermal, and fouling properties for the given application. Graphene oxide membranes have arisen as an alternative to polymer and ceramic membranes, due, at least in part, to its compatibility with a variety of environments, theoretically high flux, and theoretically small interlayer spacing (e.g., molecular weight cutoff). However, many graphene oxide membranes suffer from at least some of the same limitation as their polymeric and ceramic counterparts, as illustrated in FIG. 1.

Figure 1:
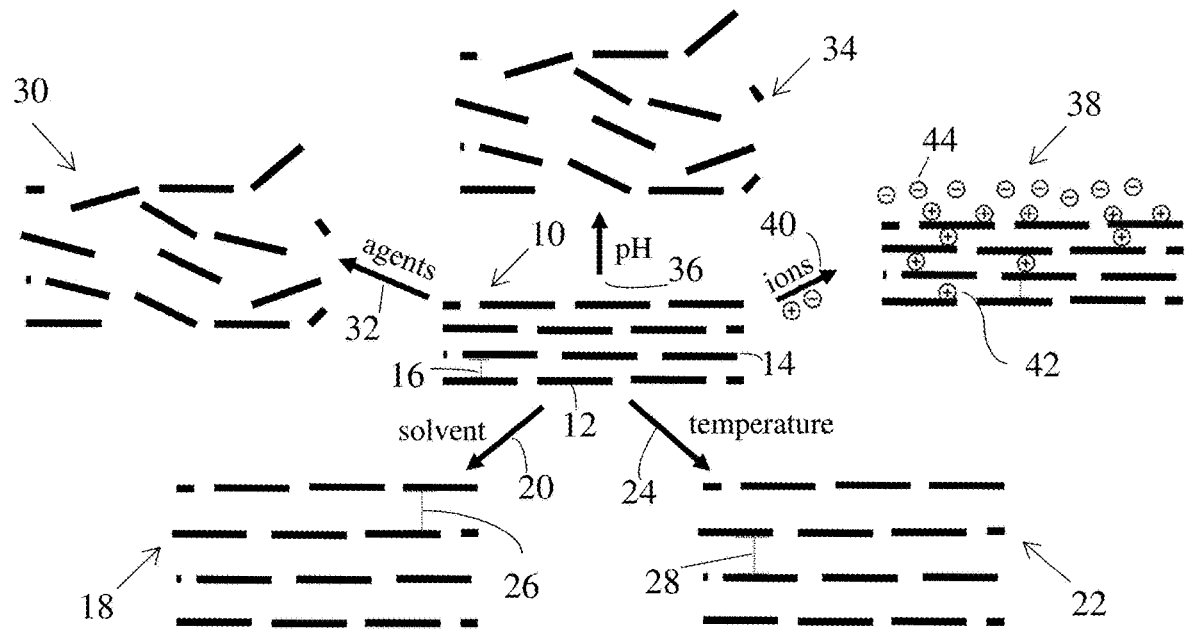
FIG. 1 is a schematic of a graphene oxide membrane under various conditions, according to certain embodiments.

FIG. 1 shows a schematic of an existing graphene oxide membrane 10. Graphene oxide is an oxidized form of graphene having oxygen containing pendant functional groups (e.g., epoxide, carboxylic acid, hydroxyl) that exist in the form of single atom thick sheets. A graphene oxide membrane may be formed by orienting the graphene oxide sheets 12 into stacked layers 14, in which a majority of the sheets are parallel to one another, as shown in FIG. 1. Theoretically, the distance 16 between the layers (e.g., interlayer spacing, d-spacing) is relatively small and could provide a controlled molecular weight cutoff for filtration. Membranes having such a small molecular weight cutoff would be beneficial in applications, such as desalination of water.

However, as illustrated in FIG. 1 by membranes 18 and 22 and corresponding arrows 20 and 24, respectively, graphene oxide membranes swells and/or are destabilized in many solvents (e.g., water, nonpolar solvents) and/or at elevated temperatures, which greatly increases the d-spacing (e.g., 26, 28) of the membrane. Without being bound by theory, it is believed that the interaction (e.g., van der Waals interactions) between the graphene oxide sheets are relatively weak and certain solvents and/or solvents at certain temperatures enter into the region between the sheets and disrupt at some of these interactions resulting in swelling and/or destabilization. Some graphene oxide membranes have used crosslinking to prevent destabilization of the membrane in solvents and elevated temperatures, but these membranes still have a d-spacing that is significantly larger than the theoretical d-spacing. Graphene oxide membranes may also be destabilized by certain agents (e.g., oxidizing agents) and at certain pHs (e.g., pH of less than or equal to about 5, pH of greater than or equal to about 8) as illustrated by membranes 30 and 34 as well as corresponding arrows 32 and 36, respectively. While certain crosslinks have been used to stabilize graphene oxide membrane in certain solvents and/or at elevated temperatures, graphene oxide membranes often have crosslinks that are susceptible to cleavage and/or degradation by certain agents (e.g., oxidizing agents) and at certain pHs, and thus fail to prevent destabilization. In addition, many existing graphene oxide membrane comprise ionizable functional groups and are charged under certain conditions. Charged membranes may interact (e.g., form a noncovalent bond) with certain oppositely charged molecules, which may increase the risk of membrane fouling. For example, as shown in FIG. 1 by membrane 38 as well as arrow 40, positive ions 42 may associate with the negatively charged functional groups (e.g., carboxylate groups) on the graphene oxide membrane. Moreover, certain molecules having a similar charge (e.g., negatively charge) as the charged graphene oxide membrane may be unable to pass through the membrane due to charge repulsion. As illustrated in FIG. 1, negative ions 44 are unable to pass through negatively charged membrane 38, even though negative ions 44 are smaller than the d-spacing of the membrane. Accordingly, there is a need for graphene oxide membranes that can achieve the desired separation efficiency (e.g., percent rejection) with a suitable flux while having the requisite chemical, physical, thermal, and fouling properties for a given application.

Figure 2:
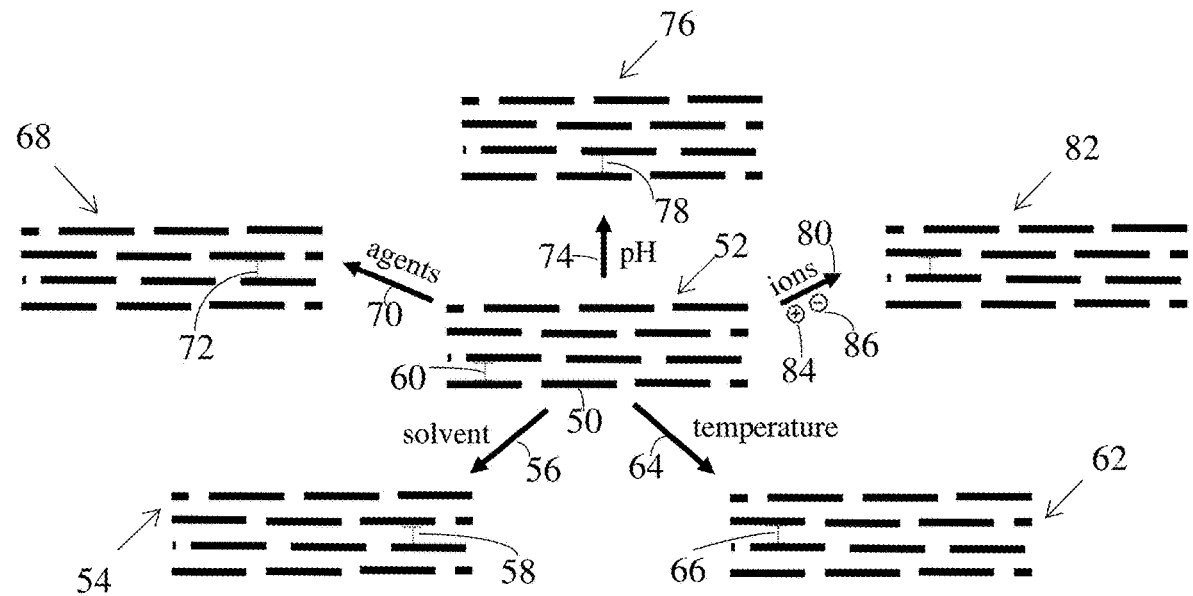
FIG. 2 is a schematic of a graphene oxide membrane under various conditions, according to one set of embodiments.

In some embodiments, a membrane comprising graphene oxide sheets that have undergone one or more chemical treatments, as described herein, does not suffer from one or more limitations of existing ultrafiltration and/or nanofiltration membranes. For example, as illustrated in FIG. 2, graphene oxide sheets 50 and/or membrane 52 may have undergone one or more chemical treatment that impart beneficial properties related to compatibility, physical stability, and/or charge neutrality. For instance, as described in more detail below, graphene oxide sheets 50 and/or membrane 52 may undergo one or more chemical treatments (e.g., chemical reaction) that forms chemical linkages (e.g., crosslinks) between at least a portion (e.g., substantially all) of the graphene oxide sheets. The chemical linkages may serve to stabilize the graphene oxide membrane from destabilization in solvents and/or at elevated temperatures. In certain embodiments, the chemical linkages may have a length that significantly reduces swelling of membrane, such that the d-spacing of the membrane in solvents and/or at elevated temperatures is substantially similar (e.g., no greater than about 1 Å) to the theoretical d-spacing and/or dry d-spacing. For example, as illustrated in FIG. 2 by arrow 56, crosslinked membrane 54 having chemical linkages may have a d-spacing 58 when saturated in a solvent (e.g., chlorinated solvent, nonpolar solvent) that is substantially the same as the d-spacing 60 of membrane 52. As another example, membrane 62 operating at elevated temperatures (e.g., greater than 65° C. in water), as indicated by arrow 64, may have a d-spacing 66 that is substantially the same as d-spacing 60 of membrane 52. As used herein, the term "dry d-spacing" refers to the interlayer spacing between graphene oxide layers in a membrane, as determined by X-ray diffraction, after the membrane has been dried at room temperature (e.g., between about 20° and about 25° C.) for 24 hours. The term "solvent saturated d-spacing" or "wet d-spacing" refers to the interlayer spacing between graphene oxide layers in a membrane as determined by X-ray diffraction after the membrane has been saturated in the solvent (e.g., water) for at least 30 seconds characterized immediately after excess moisture is removed from the surfaces of the membrane.

In certain embodiments, as described in more detail below, graphene oxide sheets 50 and/or membrane 52 may undergo one or more chemical treatments (e.g., chemical reaction) to form chemical linkages that are resistance to cleavage and/or degradation by certain agents (e.g., oxidizing agents) and/or at certain pHs. For example, as illustrated in FIG. 2 by arrow 70, crosslinked membrane 68 having certain chemical linkages (e.g., comprising an ester) may have a d-spacing 72 that is substantially the same as d-spacing 60 of membrane 52 after extended exposure to certain agents (e.g., oxidizing agents). As another example, as illustrated in FIG. 2 by arrow 74, crosslinked membrane 76 having certain chemical linkages (e.g., comprising an ether) may have a d-spacing 78 that is substantially the same as d-spacing 60 of membrane 52 after extended exposure to relatively low (e.g., less than or equal to about 5) and relatively high (greater than or equal to about 8) pHs.

In certain embodiments, as described in more detail below, graphene oxide sheets 50 and/or membrane 52 may undergo one or more chemical treatments (e.g., chemical reaction) that render the membrane relatively uncharged by converting at least a portion of the ionizable functional groups on the graphene oxide sheets to non-ionizable functional groups. For example, as illustrated by arrow 80, membrane 82 may be relatively uncharged, such that positive ions 84 and negative ions 86 are able to pass through the membrane with minimal or no electrostatic interactions between the ions and the membrane.

As used herein, the terms "charge neutrality" and "uncharged" when used with respect to a membrane or graphene oxide sheet refers the state of having relatively little or no charged moieties. The "charge neutrality" and "uncharged" with respect to a membrane or graphene oxide sheet do not refer to the state in which there are a substantially equal number of positive and negative charges. In some embodiments, the magnitude of the zeta potential of an uncharged membrane may have zeta potential of less than or equal to about 9 mV (e.g., less than or equal to about 5 mV, less than or equal to about 3 mV, less than or equal to about 1 mV, less than or equal to about 0.5 mV, less than or equal to about 0.1 mV) at pH 7.

As used herein, a "charged moiety" is a chemical moiety that carries a formal electronic charge, e.g., monovalent (+1), divalent (+2), trivalent (+3), etc. The charge of the charged moiety may vary, in some cases, with the environmental conditions, for example, changes in pH may alter the charge of the moiety, and/or cause the moiety to become charged or uncharged. Typically, the charge of a moiety is determined under environmental conditions at which the membrane is used. It should be understood the terms "charged" or "charged moiety" does not refer to a "partial negative charge" or "partial positive charge" on a group or membrane. The terms "partial negative charge" and "partial positive charge" are given their ordinary meaning in the art. A "partial negative charge" may result when a functional group comprises a bond that becomes polarized such that electron density is pulled toward one atom of the bond, creating a partial negative charge on the atom. Those of ordinary skill in the art will, in general, recognize bonds that can become polarized in this way.

In some embodiments, as described in more detail below, the type and/or timing of one or more of the chemical treatments may allow relatively thick membranes (e.g., greater than or equal to about 0.5 microns, greater than or equal to about 1 microns) having a relatively high weight percentage (e.g., greater than or equal to about 70 wt. %) of graphene oxide to be formed without adversely affecting the flux of the membrane. In certain embodiments, the timing of one or more of the chemical treatments with respect to the membrane formation process may allow membranes (e.g., 52) to be formed as opposed to foams that have micron size voids and/or a significant percentage of graphene oxide sheets in a disordered (e.g., non-parallel) configuration. The graphene oxide membranes, described herein, may be used to achieve the desired separation efficiencies (e.g., percent rejections) with a suitable flux while having the requisite chemical, physical, thermal, and fouling properties for a plethora of applications.

As noted above, in some embodiments, a membrane may comprise graphene oxide sheets having undergone one or more chemical treatments to form chemical linkages between at least a portion of the graphene oxide sheets in the membrane. A chemical linkage may attach (e.g., covalently) the backbone of a graphene oxide sheet to the backbone of another (e.g., adjacent) graphene oxide sheet. In some embodiments, the length of the chemical linkage may be selected to impart desirable properties and/or control the interlayer spacing, and accordingly the molecular weight cutoff, of the graphene oxide membrane. For instance, in certain embodiments, the chemical linkage may have a length that substantially reduces swelling of the membrane in certain environments (e.g., solvents, elevated temperatures) and/or prevents destabilization of the membrane. In some instances, the chemical linkage may have a length that substantially reduces swelling of the membrane, such that the difference between the dry d-spacing and the solvent saturated d-spacing of the membrane is relatively small (e.g., less than or equal to about 1.5 Å) and/or the difference between the theoretical d-spacing and the solvent saturated d-spacing of the membrane is relatively small (e.g., less than or equal to about 1.5 Å).

Figure 3:
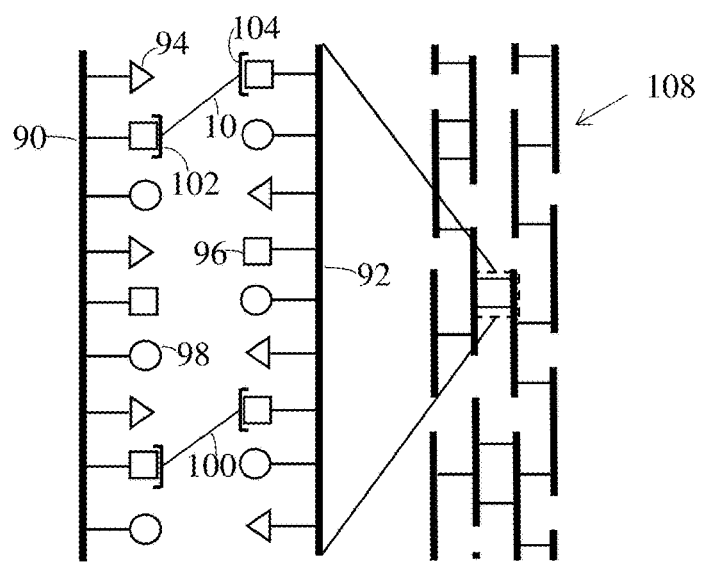
FIG. 3 is a schematic of a crosslinked graphene oxide membrane, according to certain embodiments.

In such some embodiments, the graphene oxide membranes, described herein, may have a smaller d-spacing (e.g., solvent saturated) than some existing graphene oxide membranes, including existing graphene oxide membranes comprising crosslinks. The relatively small d-spacing of certain inventive graphene oxide membranes may be due to the inventive structure and process of forming the chemical linkages. Some graphene oxide membranes utilize multifunctional (e.g., bifunctional) linkers to form crosslinks between graphene oxide sheets. The length, rigidity, and solvation properties of the such linker may dictate, at least part, the solvent saturated d-spacing of the membrane. For example, as illustrated in FIG. 3, a first graphene oxide sheet 90 and a second graphene oxide sheet 92 may comprise functional groups 94 (triangles), 96 (squares), and 98 (circles). A bifunctional linker 100 may comprise a first reactive end 102 that react with a functional group of first graphene oxide sheet 90 and a second reactive end 104 that reacts with a functional group of second graphene oxide sheet 92. Bifunctional linker 100 may also comprises chain 106 that connects first reactive end 102 and second reactive end 104 to establish the crosslink. The d-spacing (e.g., solvent saturated) of membrane 108 may be expanded to accommodate the space occupied by the reactive ends and chain of linker 100.

It has been discovered, within the context of certain inventive embodiments, that one or more chemical treatments may be used to form chemical linkages between graphene oxide without the need for multifunctional linkers. The chemical treatment(s) may be used to react functional groups (e.g., which are directly covalently bonded to the backbone of graphene oxide) on the graphene oxide sheets with one another to form chemical linkages having a relatively small length (e.g., about two bond lengths, three bond lengths, greater than or equal to about 3 Å and less than or equal to about 20 Å, greater than or equal to about 3 Å and less than or equal to about 15 Å, greater than or equal to about 3 Å and less than or equal to about 12 Å, greater than or equal to about 3 Å and less than or equal to about 9 Å). In some such embodiments, one or more of the chemical treatments may comprise converting a native functional group (e.g., pendant functional group) on a graphene oxide sheet to an activated functional group and reacting the activated functional group with a functional group on another graphene oxide sheet to from a chemical linkage. In some embodiments the activated functional group is a sulfonate ester, halide, amine, acid chloride, thiol, aldehyde, anhydride, ester, or amide. In certain embodiments, the functional group on the other graphene oxide sheet is a hydroxyl, carboxylic acid, or an epoxy.

As used herein, the term "native functional group" may refer to the functional groups on a graphene oxide sheet prior to any chemical treatment of the graphene oxide sheet. Those of ordinary skill in the art would be aware of the native functional groups on graphene oxide. In general, graphene oxide has carbon atoms substituted with oxygen containing functional groups. For instance, graphene oxide may have greater than 0% and less than or equal to about 40% of the carbon atoms in the backbone of the graphene substituted with oxygen containing functional groups (e.g., greater than or equal to about 1% and less than or equal to about 40%).

As used herein, the term "activated functional group" may refer to a functional group that has an increased reaction rate with the reactant of interest (e.g., native graphene oxide groups). The increased reaction rate may be relative to the functional group from which the activated functional group was derived and/or a native functional group on graphene oxide.

Figure 4:
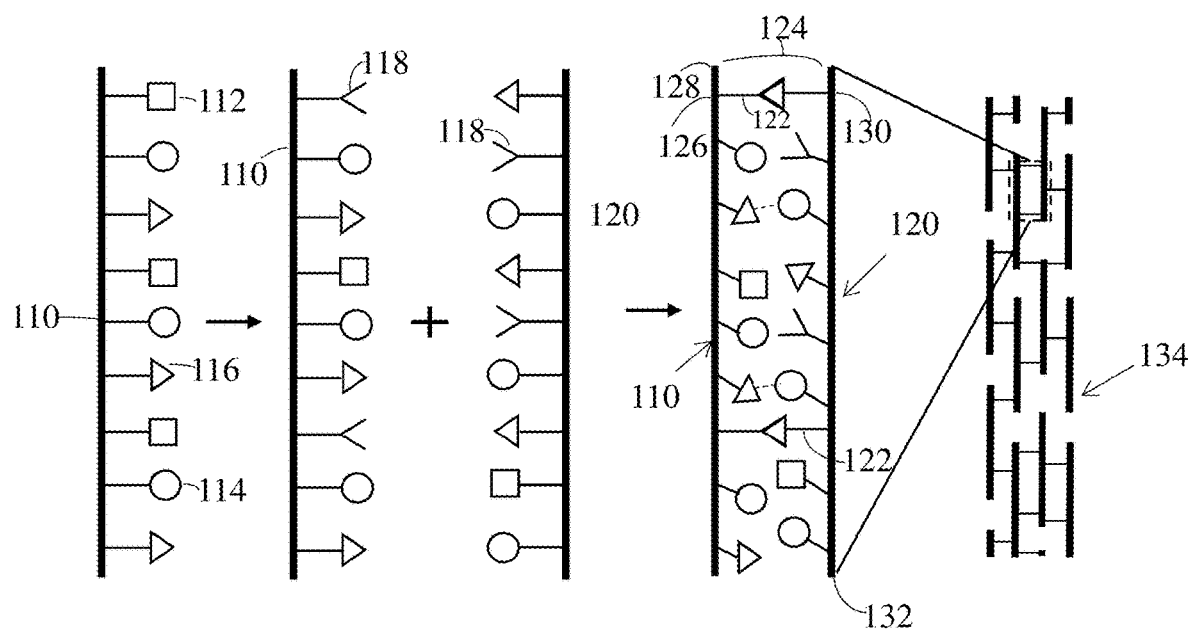
FIG. 4 is a schematic of a method of forming a crosslinked graphene oxide membrane, according to one set of embodiments.

In some such embodiments, as illustrated in FIG. 4, a first graphene oxide sheet 110 having native functional groups 112 (squares), 114 (circles), and 116 (triangles) may be exposed to one or more chemical treatments that converts one or more native functional groups (e.g., carboxylic acid, hydroxyl) to a different functional group via a functional group interconversion reaction. For example, at least a portion of native functional groups 112 on graphene oxide sheet 110 may be converted to a functional group 118, which is different than functional group 112. Functional group 118 may be an activated functional group and may have an increased reaction rate with a native functional group on another graphene oxide sheet relative to functional group 112. Functional groups (e.g., 118) on first graphene oxide sheet 110 may be allowed to react with functional groups (e.g., 116) on a second graphene oxide sheet 120 that has also been exposed to one or more chemical treatments that converts one or more native functional groups to a different, activated functional group via a functional group interconversion reaction. In some embodiments, as illustrated in FIG. 4, second graphene oxide sheet 120 may be exposed to substantially the same chemical treatments as first graphene oxide sheet 110, such that at least some of native functional groups 112 on graphene oxide sheet 120 are converted to functional group 118. In other embodiments, second graphene oxide sheet 120 may be exposed to different chemical treatments than first graphene oxide sheet 110. In such cases, sheet 120 may or may not comprise a functional group that is different from sheet 110. Graphene oxide sheets 110 and 120 may be exposed to one or more chemical treatments that facilitate the reaction between the activated functional groups 118 and functional groups 116. The reaction may result in chemical linkages 122 between graphene oxide sheets 110 and 120. The chemical linkages may have a relatively small length 124. For example, as illustrated in FIG. 4, the length of chemical linkage 122 is the distance between the point of attachment 126 of the chemical linkage on the backbone 128 of the first graphene oxide sheet and the point of attachment 130 of the chemical linkage on the backbone 132 of the first graphene oxide sheet. In some embodiments, membrane 134 comprising chemical linkages 124 may have a relatively small difference between the dry d-spacing and the solvent saturated d-spacing of the membrane and/or a relatively small difference between the difference between the theoretical d-spacing and the solvent saturated d-spacing of the membrane. Crosslinked graphene oxide membranes may be formed by converting at least a portion of functional groups on graphene oxide sheets, as described herein, to activated functional groups and reacting the activated functional groups with functional groups on other graphene oxide sheets.

As used herein, the term "functional group interconversion reaction" may refer to a reaction that converts one functional group into another by substitution, addition, elimination, oxidation, and/or reduction.

Figure 5A:
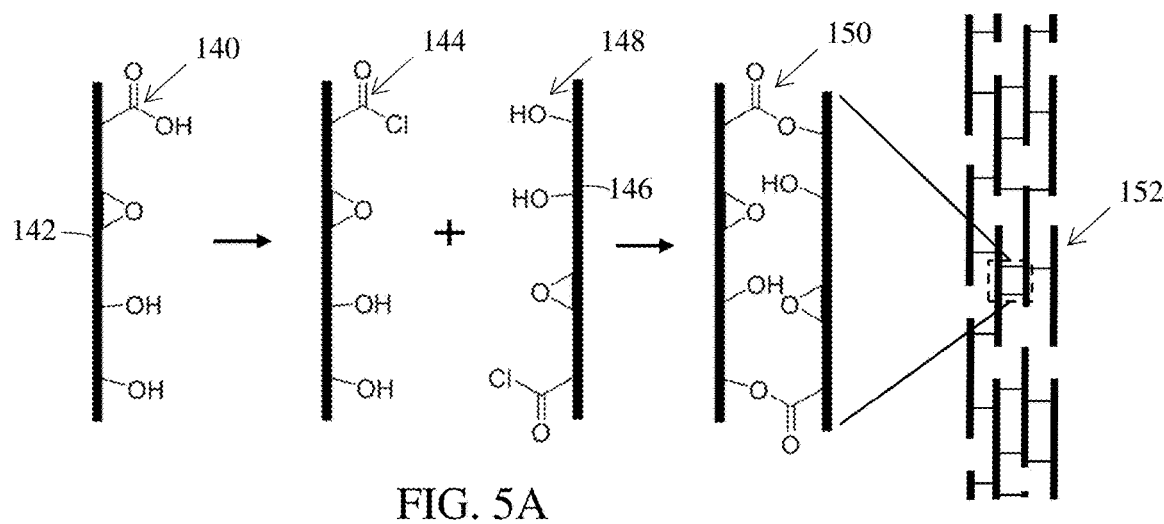
FIG. 5A is a schematic of a method of forming a crosslinked graphene oxide membrane, according to certain embodiments.

Non-limiting examples of chemical treatment(s) used to convert a native functional group on a graphene oxide sheet to an activated functional group and reacting the activated functional group with a functional group on another graphene oxide sheet to from a chemical linkage having a relatively small length are shown in FIGS. 5A-5G. In some embodiments, as illustrated in FIG. 5A, a native carboxylic acid group 140 on a graphene oxide sheet 142 may be converted to an acid chloride 144 by exposing the graphene oxide sheet to certain functional group interconversion reaction conditions.

For example, the graphene oxide sheet may be exposed to oxalyl chloride and dimethylformanide or may be exposed to $SOCl_2$ or $PCl_5$. The acid chloride may have an increased reaction rate with hydroxyl groups relative to the native carboxylic acid. The graphene oxide sheet comprising the acid chloride may be reacted with a second graphene oxide sheet 146 that has undergone similar chemical treatment(s). The acid chloride on the graphene oxide sheet may react with a native hydroxyl group 148 on the second graphene oxide sheet to from an ester bond 150 and vice versa. The resulting chemical linkage may consists of the ester group and may have a length of about three bond lengths. In some embodiments, the length of the chemical linker may be less than the d-spacing. In certain embodiments, the d-spacing is substantially the same as the length of the chemical linker. A crosslinked graphene oxide membrane 152 may be formed by converting at least a portion of carboxylic acid groups on graphene oxide sheets to acid chloride groups and reacting the acid chloride groups with hydroxyl groups on other graphene oxide sheets.

Figure 5B:
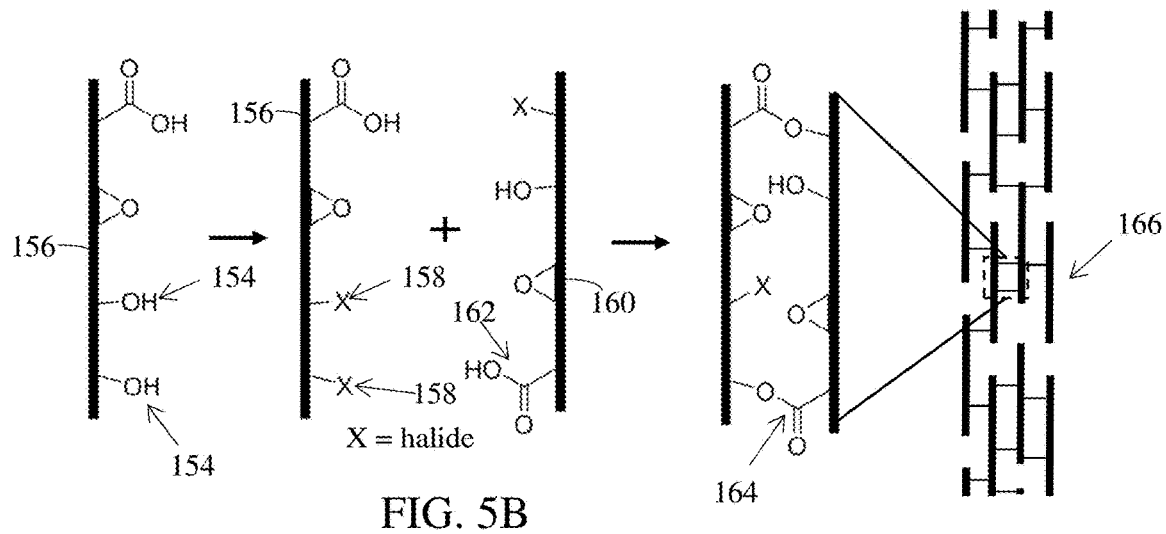
FIG. 5B is a schematic of a method of forming a crosslinked graphene oxide membrane, according to one set of embodiments.

In some embodiments, as illustrated in FIG. 5B, at least a portion of the native hydroxyl groups 154 on a graphene oxide sheet 156 may be converted to halides (e.g., Br, Cl, I, F) 158 by exposing the graphene oxide sheet to certain functional group interconversion reaction conditions. For example, the graphene oxide sheet may be exposed to a sulfonyl chloride in the presence of a base and then a halide salt. Those of ordinary skill in the art would be knowledgeable of suitable halogenation reactions and conditions. The halide may have an increased reaction rate with carboxylic acid groups relative to the native hydroxyl. The graphene oxide sheet comprising the halide may be reacted with a second graphene oxide sheet 160 that has undergone similar chemical treatment(s). The halide on graphene oxide sheet 156 may react with a native carboxylic acid group 162 on the second graphene oxide sheet to from an ester bond 164 and vice versa. The resulting chemical linkage may consists of the ester group and may have a length of about three bond lengths. A crosslinked graphene oxide membrane 166 may be formed by converting at least a portion of the hydroxyl groups on graphene oxide sheets to halides and reacting the halides with carboxylic acid groups on other graphene oxide sheets.

Figure 5C:
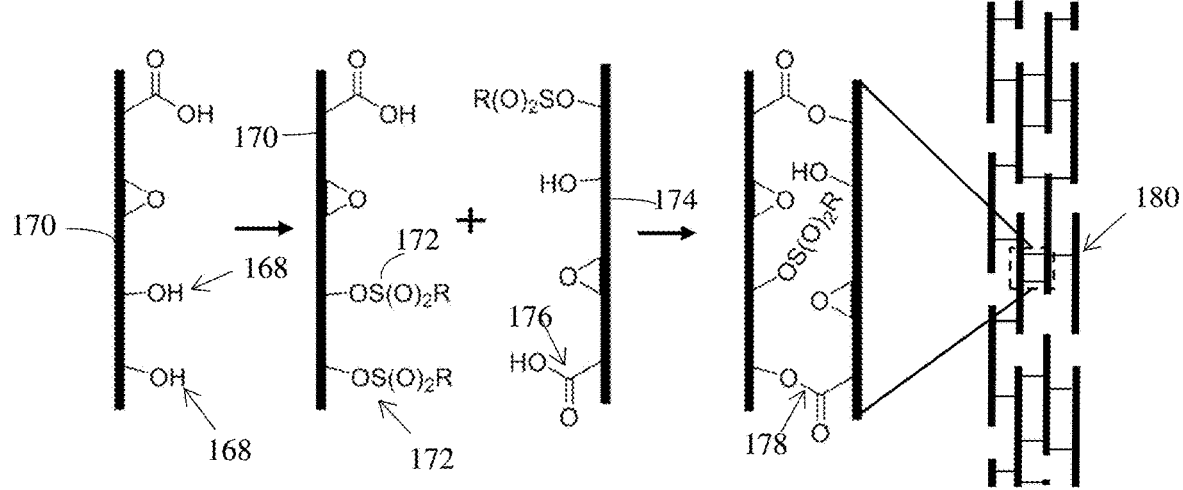
FIG. 5C is a schematic of a method of forming a crosslinked graphene oxide membrane, according to certain embodiments.

In some embodiments, as illustrated in FIG. 5C, at least a portion of the native hydroxyl group 168 on a graphene oxide sheet 170 may be converted to a sulfonate ester (e.g., tosylate, mesylate, triflate) 172 by exposing the graphene oxide sheet to certain functional group interconversion reaction conditions. For example, the graphene oxide sheet may be exposed to the corresponding sulfonyl chloride of the sulfonate ester in the presence of a base (e.g., pyridine). The sulfonate ester may have the structure—$OS(O)_2R$, wherein R is alkyl, haloalkyl, or optionally substituted aryl. The sulfonate ester may have an increased reaction rate with carboxylic acid groups relative to the native hydroxyl. The graphene oxide sheet comprising the sulfonate ester may be reacted with a second graphene oxide sheet 174 that has undergone similar chemical treatment(s). The sulfonate ester on the graphene oxide sheet may react with a native carboxylic acid group 176 on the second graphene oxide sheet to from an ester bond 178 and vice versa. The resulting chemical linkage may consists of the ester group and may have a length of about three bond lengths. A crosslinked graphene oxide membrane 180 may be formed by converting at least a portion of the hydroxyl groups on graphene oxide sheets to sulfonate ester groups and reacting the sulfonate ester groups with carboxylic acid groups on other graphene oxide sheets.

Figure 5D:
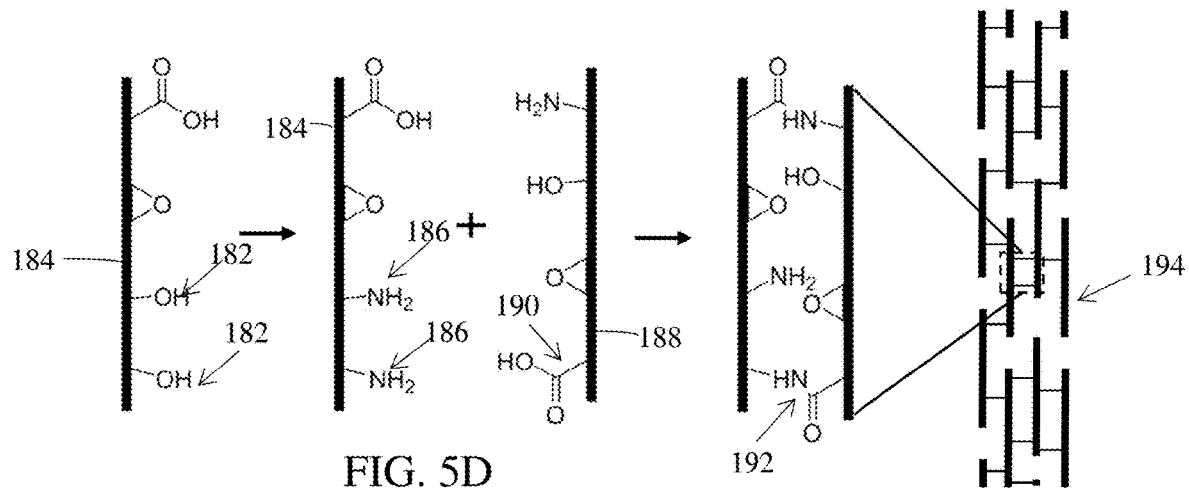
FIG. 5D is a schematic of a method of forming a crosslinked graphene oxide membrane, according to one set of embodiments.

In some embodiments, as illustrated in FIG. 5D, at least a portion of the native hydroxyl groups 182 on a graphene oxide sheet 184 may be converted to an amine 186 by exposing the graphene oxide sheet to certain functional group interconversion reaction conditions. For example, the graphene oxide sheet may be exposed to amination via Smiles rearrangement conditions (e.g., NaOH, 2-bromo-2-methylpropionamide, and dimethylacetamide). The amine may have an increased reaction rate with carboxylic acids relative to the native hydroxyl. The graphene oxide sheet comprising the amine may be reacted with a second graphene oxide sheet 188 that has undergone similar chemical treatment(s). An amine on graphene oxide sheet 184 may react with a native carboxylic acid 190 on the second graphene oxide sheet to from an amide bond 192 and vice versa. The resulting chemical linkage may consists of the amide group and may have a length of about three bond lengths. A crosslinked graphene oxide membrane 194 may be formed by converting at least a portion of hydroxyl groups on graphene oxide sheets to amine groups and reacting the amine groups with carboxylic acid groups on other graphene oxide sheets.

Figure 5E:
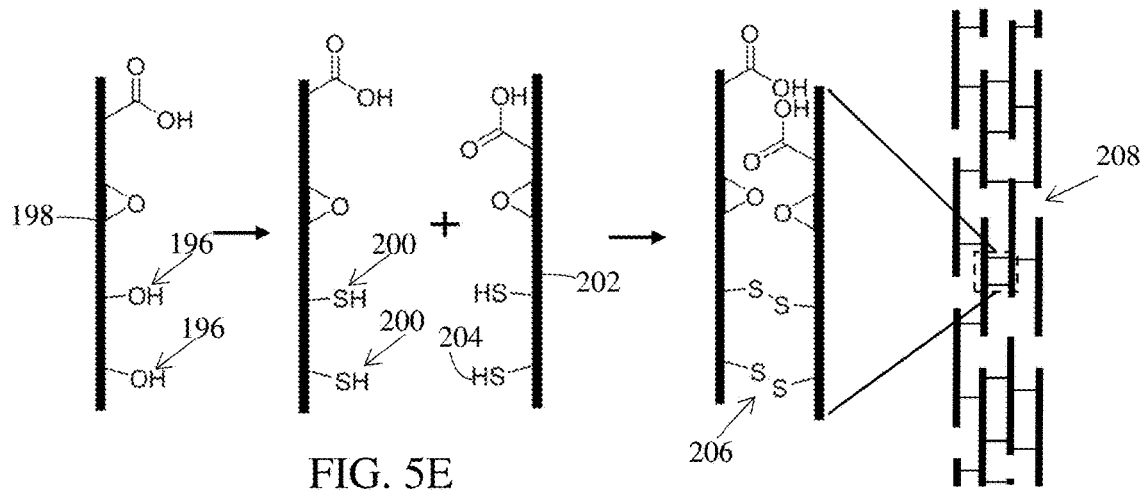
FIG. 5E is a schematic of a method of forming a crosslinked graphene oxide membrane, according to certain embodiments.

In some embodiments, an activated functional group may react with another activated functional group. For instance, as illustrated in FIG. 5E, at least a portion of the native hydroxyl groups 196 on a graphene oxide 198 sheet may be converted to a thiol 200 by exposing the graphene oxide sheet to certain functional group interconversion reaction conditions. For example, the graphene oxide sheet may be exposed to Grignard reaction conditions and then to sulfur or a thiourea. The graphene oxide sheet comprising the thiol may be reacted with a second graphene oxide sheet 202 that has undergone similar chemical treatment(s). The thiols on the graphene oxide sheet may react with other thiols 204 on the second graphene oxide sheet to from a disulfide bonds 206 and vice versa. The resulting chemical linkage may consists of the disulfide and may have a length of about three bond lengths. A crosslinked graphene oxide membrane 208 may be formed by converting at least a portion of the hydroxyl groups on graphene oxide sheets to thiol groups and reacting the thiol groups with thiol groups on other graphene oxide sheets.

Figure 5F:
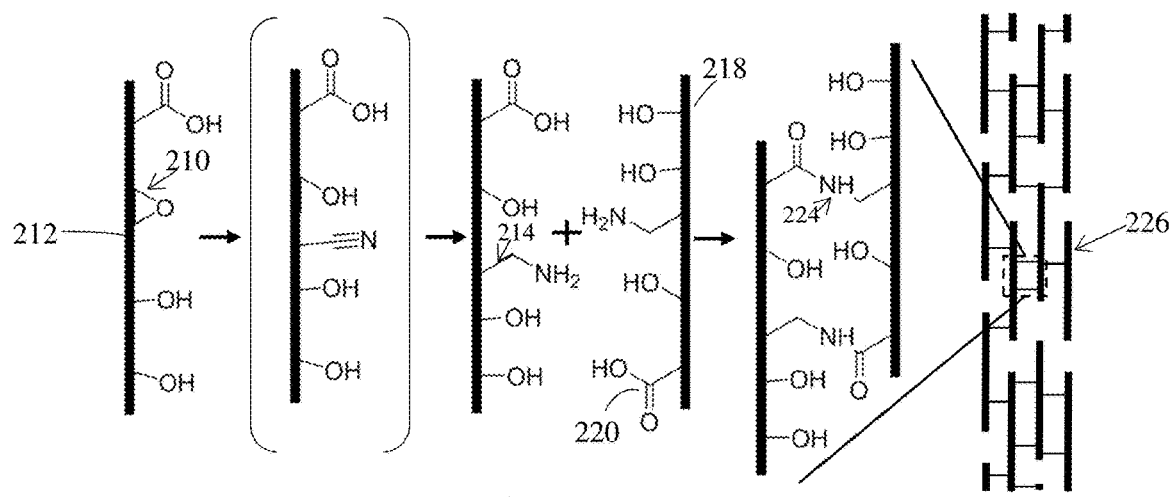
FIG. 5F is a schematic of a method of forming a crosslinked graphene oxide membrane, according to one set of embodiments.

In some embodiments, as illustrated in FIG. 5F, a native epoxide 210 on a graphene oxide sheet 212 may be converted to a methylene amine 214 and a hydroxyl group 216 by exposing the graphene oxide sheet to certain functional group interconversion reaction conditions. For example, the graphene oxide sheet may be exposed to catalytic (e.g., metal catalyst and $H_2$) or non-catalytic (e.g., metal hydride) reduction conditions. The graphene oxide sheet comprising the methylene amine may be reacted with a second graphene oxide sheet 218 that has undergone similar chemical treatment(s). The methylene amine on the graphene oxide sheet may react with a native carboxylic acid 220 on the second graphene oxide sheet 218 to from an amide bond 224 and vice versa. The resulting chemical linkage may consists of the amide group and may have a length of about four bond lengths. A crosslinked graphene oxide membrane 226 may be formed by converting at least a portion of the epoxides on graphene oxide sheets to methylene amine groups and reacting the methylene amine groups with carboxylic acid groups on other graphene oxide sheets.

Figure 5G:
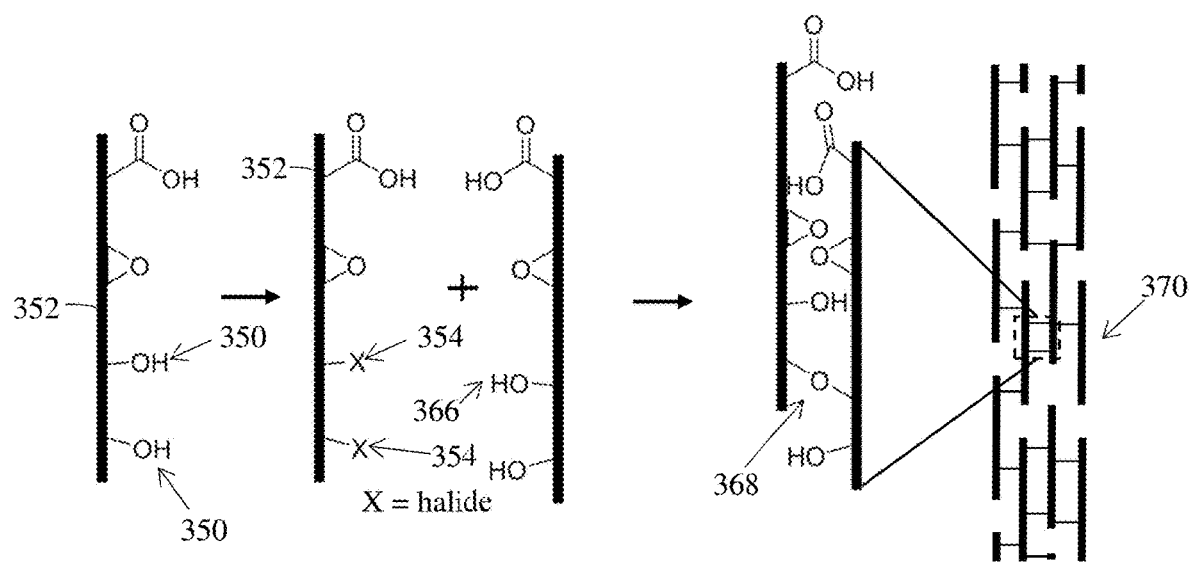
FIG. 5G is a schematic of a method of forming a crosslinked graphene oxide membrane, according to one set of embodiments.

In some embodiments, as illustrated in FIG. 5G, at least a portion of the native hydroxyl groups 350 on a graphene oxide sheet 352 may be converted to halides (e.g., Br, Cl, I, F) 354 by exposing the graphene oxide sheet to certain functional group interconversion reaction conditions as described above with respect to FIG. 5B. The graphene oxide sheet comprising the halide may be reacted with a second graphene oxide sheet 160 that has undergone similar chemical treatment(s). The halide on graphene oxide sheet 352 may react with a native hydroxyl group 366 on the second graphene oxide sheet to from an ether bond 368 and vice versa. The resulting chemical linkage may consists of the ether group and may have a length of about three bond lengths. A crosslinked graphene oxide membrane 370 may be formed by converting at least a portion of the hydroxyl groups on graphene oxide sheets to halides and reacting the halides with hydroxyl groups on other graphene oxide sheets.

In some embodiments, the activated functional group may be a sulfonate ester, a halide, an amine, —OH, —CN, —NCO, —OCN, C(O)Cl, C(O)NR″, —C(O)R″, —C=CR$_2$″, —C(R″)=C(R(R″)—C(R″)=CR″$_2$, —SH, —C≡CH, an epoxide, an imide, —C(O)—O—C(O)R″, —NO$_2$, or —OMgBr, wherein R″ is hydrogen or optionally substituted alkyl.

It should be understood that FIGS. 5A-5G are non-limiting examples of functional group interconversion reactions and activated functional groups that can be used to form chemical linkages and that other functional group interconversion reactions, functional group interconversion conditions, and activated functional groups can be used.

In certain embodiments, the chemical treatment(s) used to react functional groups directly attached to the backbone of the graphene oxide sheets may comprise activating a chemical moiety on a graphene oxide sheet and reacting the activated chemical moiety with a functional group on another graphene oxide sheet to from a chemical linkage. As used herein, activation of a chemical moiety refers to a process that increases the reactivity of the chemical moiety toward a particular group (e.g., native functional group) relative to the reactivity of the chemical moiety prior to the activation step. For example, a carbonyl moiety in an ester group may be activated by hydrogen bonding of the oxygen in the carbonyl with a proton donor. The carbonyl having the hydrogen bond may have a greater reactivity toward nucleophiles than the carbonyl lacking the hydrogen bond.

Figure 6:
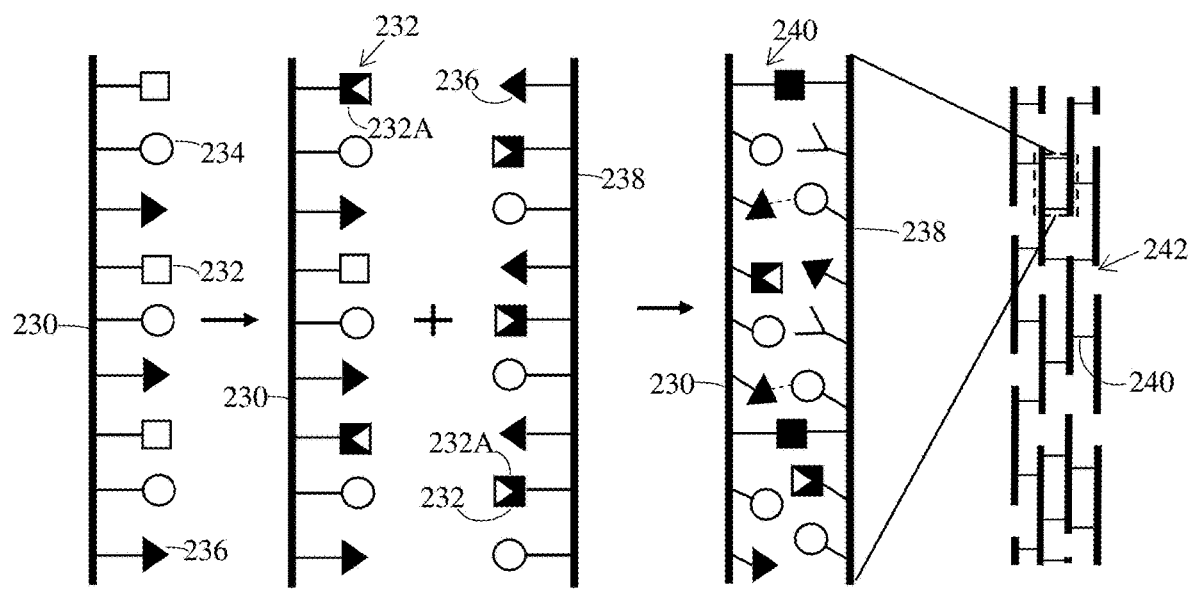
FIG. 6 is a schematic of a method of forming a crosslinked graphene oxide membrane, according to certain embodiments.

In one example, as illustrated in FIG. 6, a first graphene oxide sheet 230 may have functional groups 232 (squares), 234 (circles), and 236 (solid triangles). First graphene oxide sheet 230 may be exposed to one or more chemical treatments that serve to activate one or more functional groups on graphene oxide sheet 230 for reaction with another functional group on another graphene oxide sheet. For instance, first graphene oxide sheet 230 may be exposed to one or more chemical treatments that activate a chemical moiety 232A within functional group 232. The activation step may activate chemical moiety 232A for reaction with functional group 236 on a second graphene oxide sheet 238. In certain embodiments, the group (e.g., functional group) comprising the chemical moiety may be different after the activation step. For instances, the group (e.g., functional group) comprising the chemical moiety may be a different group after activation and/or may have different and/or additional chemical interactions (e.g., covalent bonds, noncovalent bonds, hydrogen bonds, electrostatic interactions, van der Waal interactions, dipole dipole interactions). In some embodiments, as illustrated in FIG. 6, second graphene oxide sheet 238 may be exposed to substantially the same chemical treatments as first graphene oxide sheet 230, such that chemical moiety 232A is activated. In other embodiments, second graphene oxide sheet 238 may be exposed to different chemical treatments than first graphene oxide sheet 230. Graphene oxide sheets 230 and 238 may be exposed to one or more chemical treatments that facilitate the reaction between activated chemical moieties 232A and functional groups 236. The reaction may result in chemical linkages 240 between graphene oxide sheets 230 and 238. The chemical linkages may have a relatively small length. In some embodiments, membrane 242 comprising chemical linkages 240 may have a relatively small difference between the dry d-spacing and the solvent saturated d-spacing of the membrane and/or a relatively small difference between the difference between the theoretical d-spacing and the solvent saturated d-spacing of the membrane. Crosslinked graphene oxide membranes may be formed by activating at least a portion of certain chemical moieties on graphene oxide sheets, as described herein, and reacting the activated chemical moieties with functional groups on other graphene oxide sheets.

Figure 7:
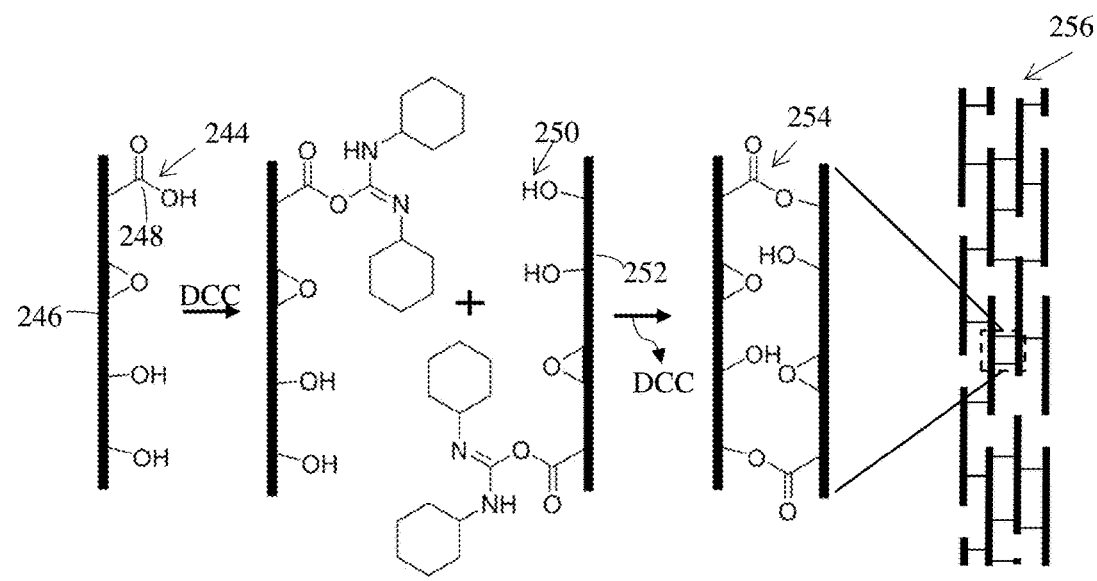
FIG. 7 is a schematic of a method of forming a crosslinked graphene oxide membrane, according to one set of embodiments.

A non-limiting example of chemical treatment(s) used to activate a chemical moiety on a graphene oxide sheet and react the activated chemical moiety with a functional group on another graphene oxide sheet to from a chemical linkage having a relatively small length is shown in FIG. 7. In some embodiments, as illustrated in FIG. 7, a native carboxylic acid group 244 on a graphene oxide sheet 246 may be reacted with dicyclohexanecarbodiimide (i.e., DCC) to activate the carbonyl moiety 248 for reaction with hydroxyl group 250 on another graphene oxide sheet. The activated carbonyl may have increased reactivity with hydroxyl groups relative to the carbonyl moiety prior to activation. The graphene oxide sheet comprising the activated carbonyl moiety may be reacted with a second graphene oxide sheet 252 that has undergone similar chemical treatment(s). The activated carbonyl moiety 244 on graphene oxide sheet 246 may react with a native hydroxyl group 250 on second graphene oxide sheet 252 to from an ester bond 254 and vice versa. The resulting chemical linkage may consists of the ester group and may have a length of about three bond lengths. A crosslinked graphene oxide membrane 256 may be formed by activating at least a portion of the carbonyl moieties of the carboxylic acid groups on graphene oxide sheets and reacting the activated carbonyl moiety with hydroxyl groups on other graphene oxide sheets.

It should be understood that FIG. 7 is a non-limiting example of activation of a chemical moiety. Other chemical moieties can be activated and/or other activation reactions may be used. Those of ordinary skill in the art would be knowledgeable of suitable activation reactions based on general knowledge in the field and the description herein.

In general, the functional group interconversion reactions and activation reactions, described herein, may be used to produce chemical linkages having a desired length. For instance, in some embodiments, the chemical linkages may have a length of greater than or equal to about 3 Å and less than or equal to about 12 Å (e.g., greater than or equal to about 3 Å and less than or equal to about 9 Å, greater than or equal to about 3 Å and less than or equal to about 8 Å).

As noted above, in some embodiments, a membrane may comprise graphene oxide sheets having undergone one or more chemical treatments to form chemical linkages that are resistance to cleavage and/or degradation in certain environments (e.g., reactive chemical environments). For instance, certain chemical linkages (e.g., comprising an ester, comprising an ether) are resistance to cleavage and/or degradation by certain agents (oxidizing agents) and/or at certain pHs (e.g., greater than or equal to about 8, less than or equal to about 5). In such some embodiments, the graphene oxide membranes, described herein, may be compatible with a wide variety of reactive chemical environments. In such some embodiments, the graphene oxide membranes, described herein, may have a broader compatibility than some existing graphene oxide membranes. In certain embodiments, the broad compatibility of certain inventive graphene oxide membranes may be due to the process of modifying chemical linkages and the resulting structures of the chemical linkages.

As used herein, the terms "compatible" and "compatibility" refers to the ability of the ability of a membrane to maintain its solvent saturated d-spacing after being exposed to an environment for an extended period of time. A membrane is compatible with an environment if the membrane has a change in solvent saturated d-spacing of less than 2 Angstroms after being saturated in the environment for 12 hours. In some embodiments, membrane that is compatible will also not disintegrate upon sonication for at least 5 min in that environment after being saturated in the environment for 12 hours. If the temperature is not dictated by the environment, the temperature used to determine compatibility is 21° C.

Figure 8:
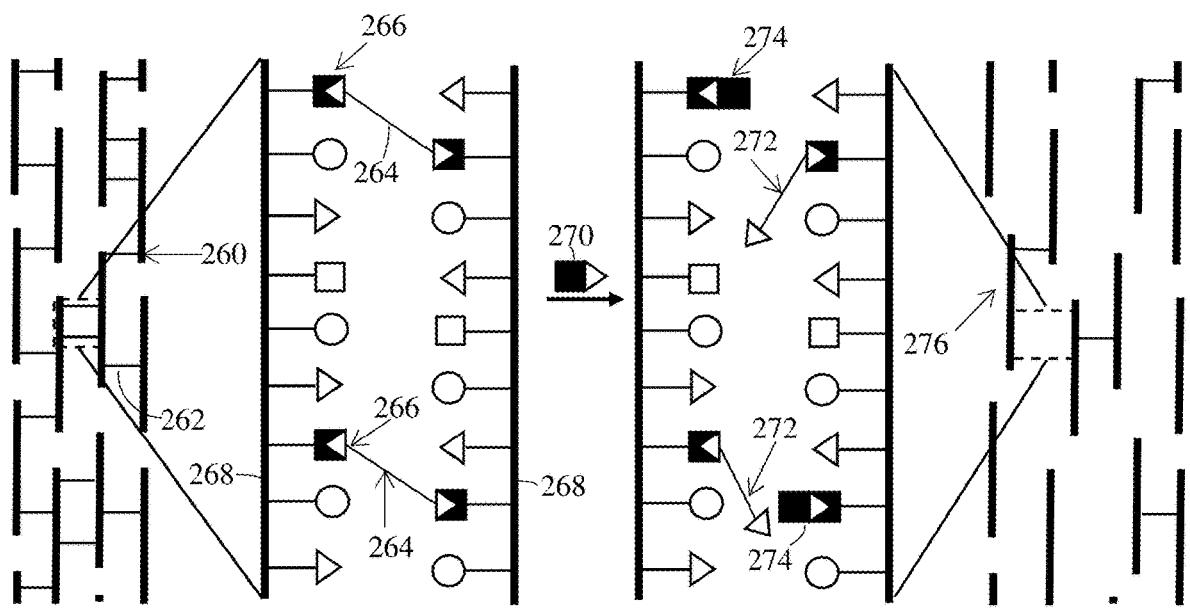
FIG. 8 is a schematic of cleavage of chemical linkages in a graphene oxide membrane by an agent, according to certain embodiments.

Some crosslinked graphene oxide membranes comprise linkages that are susceptible to cleavage and/or degradation in certain environments. For example, a linkage comprising an ester may be susceptible to degradation in high pH environments. A schematic illustration of the susceptibility of certain linkages to cleavage and/or degradation in certain environments is shown in FIG. 8. In some embodiments, as illustrated in FIG. 8, a crosslinked graphene oxide membrane 260 may comprise linkages 262 between at least a portion of the graphene oxide sheets that serve to crosslink the membrane. The crosslinks may be formed by a multi-functional linker (e.g., bifunctional linker) 264 that forms bonds 266 with the graphene oxide sheets 268. Linker 264 may be susceptible to cleavage by agent 270. In general, agent 270 may be any molecule that is capable of cleaving a chemical bond or otherwise degrading a linkage (e.g., covalent linkage). For instance, agent 270 may be an acid, a base, an oxidizing agent (e.g., peroxy acid, peroxide, hypochlorite, chlorine dioxide, dissolved chlorine), a solvent molecule, amine, a thiol, an alcohol, or combinations thereof. In some embodiments, the agent comprises chlorine. For instance, the agent may be a dissolved chlorine, hypochlorite, chlorine dioxide, or combinations thereof. In some embodiments, the agent may be an oxidizing agent, such as an oxidizing agent comprising chlorine and peroxide. In some embodiments, exposure to agent 240 (e.g., for extended periods of time, at high concentrations) may result in the cleavage of at least a portion of the linkages as illustrated by cleaved linkers 272 in FIG. 8. In certain embodiments, agent 270 may alter the functional group on the graphene oxide sheet used to form the linkage as illustrated by functional group 274. In some such embodiments, the linkage may not be able to be reformed in the environment. Cleavage of at least some of the linkages may result in increased swelling and/or destabilization of the membrane. For example, as shown in FIG. 8, membrane 276 having fewer linkages has an increased interlayer spacing compared to membrane 260. It has been discovered, within the context of certain inventive embodiments, that one or more chemical treatments may be used to modify chemical linkages between graphene oxides to impart resistance to certain chemical environments. In certain embodiments, the chemical treatment(s) may allow the chemical linkages to be modified without cleaving and/or otherwise breaking the chemical linkage. In other embodiments, the chemical treatment(s) result in the cleavage of the chemical linkage and formation of a different chemical linkage. In some embodiments, one or more chemical treatments may comprise exposing a first chemical linkage to functional group interconversion reaction conditions to convert the chemical linkage to a second chemical linkage having a different chemical structure than the first chemical linkage. Any suitable functional group interconversion reaction may be used to convert a first chemical linkage into a second chemical linkage that is more resistance to a chemical environment (e.g., low pH, high pH) or agent (e.g., oxidizing agent) than the first chemical linkage. In some embodiments, the second chemical linkage may not be susceptible to cleavage by a substitution reaction (e.g., nucleophilic substitution, electrophilic substitution) and/or an elimination reaction. For instance, the chemical linkage may not be susceptible to cleavage by bases, such as hydroxide, and/or oxidation by oxidizing (e.g., peroxides, hypochlorite, peroxy acids).

Figure 9:
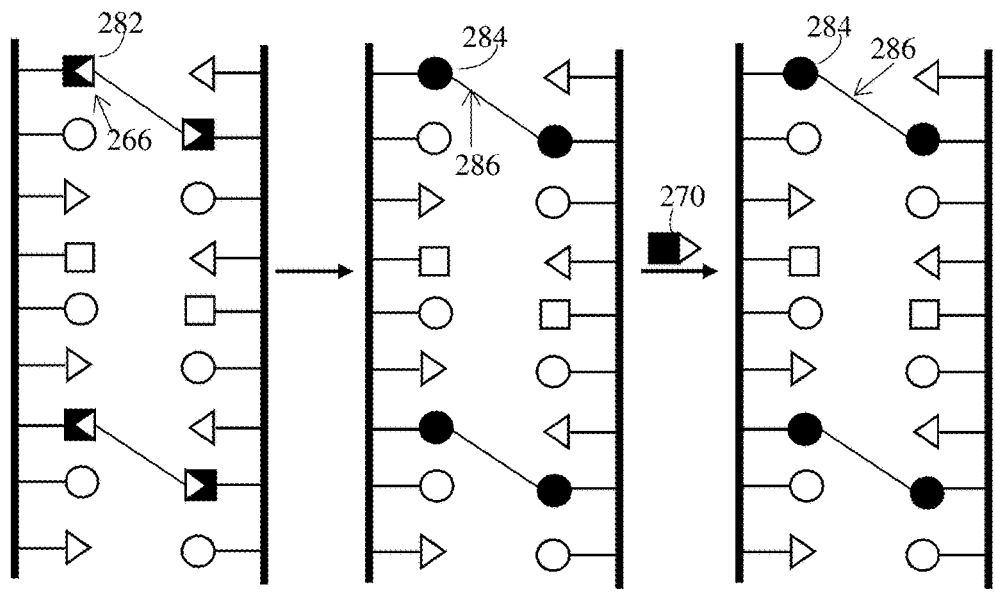
FIG. 9 is a schematic of converting a first chemical linkage into a second chemical linkage, according to one set of embodiments.

A schematic illustration of the conversion of linker 264 in FIG. 8 into a different chemical linkage that is more resistance to cleavage by agent 270 is shown in FIG. 9. As illustrated in FIG. 9, a membrane may be exposed to one or more chemical treatments that convert one or chemical moieties (e.g., carbonyl) to a different chemical moiety via a functional group interconversion reaction. For example, a chemical moiety 282 in bond 266 may be changed via a functional group interconversion reaction to a different chemical moiety resulting in formation of a different bond 284 that has a different chemical structure than bond 266 and, accordingly, the chemical linkage 286 after the conversion has a different chemical structure than linkage 264. Bond 284, and accordingly linkage 286, may be more resistant to cleavage and/or degradation by agent 270 than bond 266 and linkage 264. As illustrated in FIG. 9, linkages 286 are not cleaved by exposure to agent 270.

Figure 10:
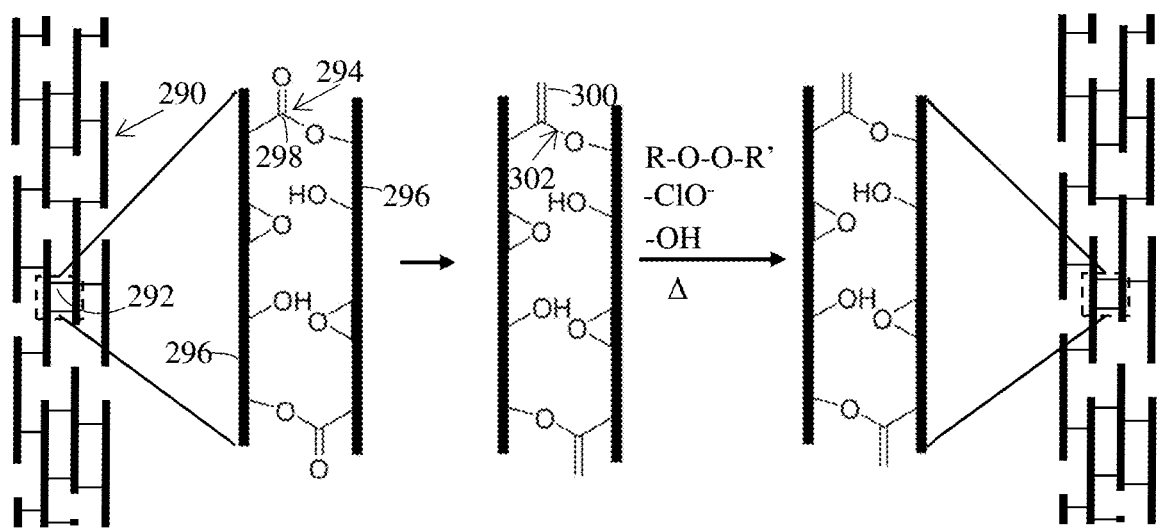
FIG. 10 is a schematic of converting a first chemical linkage into a second chemical linkage in a crosslinked graphene oxide membrane, according to certain embodiments.

A non-limiting example of chemical treatment(s) used to convert a first chemical linkage to a second chemical linkage having a different structure is shown in FIG. 10. In some embodiments, as illustrated in FIG. 10, a crosslinked graphene oxide membrane 290 may have chemical linkages 292 comprising an ester 294 between at least a portion of the graphene oxide sheets 296. The membrane may be exposed to functional group interconversion reaction conditions (e.g., Tebbe reagent, titanium-zinc methylation) to convert the carbonyl 298 of the ester into an alkene 300. Conversion of the carbonyl produces a second chemical linkage comprising an ether 302. Ethers and esters have different susceptibilities to cleavage in certain environments. For example, as illustrated in FIG. 10, exposure of linkage 292 to hydroxide at elevated temperature does not result in cleavage of linkage 292. Conversely, the chemical linkages having an ester would be susceptible to cleavage in the same environment.

It should be understood that FIG. 10 is a non-limiting example of a functional group interconversion reaction on chemical linkages and that other chemical moieties may be altered and/or functional group interconversion reactions may be used. For example, another functional group interconversion reactions that may be used to convert a first chemical linkage into a second chemical linkage include the reduction of amides to amines using a hydrogenation reaction, e.g., using hydrides.

In some embodiments, a crosslinked graphene oxide membrane comprises chemical linkages of Formula I:

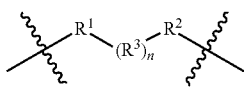

wherein:
$R^1$ is —C(O)—, —C(O)$_2$—, —O—, —S—, —N(R')—, —C(R')$_2$—, —C(=R')—, or a bond;
$R^2$ is —C(O)—, —C(O)$_2$—, —O—, —S—, —N(R')—, —C(R')$_2$—, or —C(=R')—, or a bond;
each $R^3$ is independently a bond, —O— or —N(R')—;
each R' is independently hydrogen, halide, hydroxyl, amine, or optionally substituted alkyl;
n is 1-5; and
⌇ indicates attachment to the backbone of a graphene oxide sheet.

In certain embodiments, the chemical linkages may be of Formula I, provided that when $R^1$ is —NR', then $R^2$ is not —NR'. In some embodiments, $R^3$ is a bond. In some embodiments, when $R^3$ is a bond, $R^2$ and $R^1$ are not also a bond. In some cases, $R^1$ and $R^2$ are independently —C(O)—, —C(O)$_2$—, —O—, —S—, —C(R')$_2$—, or —C(=R')—. In some cases, $R^1$ and $R^2$ are independently —C(O)—, —C(O)$_2$—, —O—, —C(R')$_2$—, or —C(=R')—. In certain cases, n is 1, 2, 3, or 4. In some cases, n is 1, 2, or 3. In certain instances, n is 1 or 2. In some embodiments, the linkage of formula I is —C(O)O—, —C(O)—, —O—, —OC(R')$_2$—, —N(R')CH$_2$—, —N(R')—, C(O)N(R')—, —OC(O)—, —OC(R')$_2$—, —C(R')$_2$—, —C(R')$_2$—C(R')$_2$—, —C(R')$_2$N(R)C(R')$_2$—, or —C(O)N(R)C(O)—. In certain embodiments, the linkage of formula I is —C(O)O—, —C(O)—, —O—, —OCH$_2$—, —OCF$_2$—, —N(R')CH$_2$—, —N(R')—, C(O)N(H)—, —OC(O)—, —OCF$_2$—, —CH(OH)—, —CH(OH)—CH$_2$—, —CH(halide)-, —CH(halide)-CH$_2$—, —CF$_2$—CH$_2$—, —CH(NR'$_3$)—, —CH(NR'$_3$)—CH$_2$—, —CH$_2$N(H)CH$_2$—, or —C(O)N(H)C(O)—.

As noted above, graphene oxide sheets have native functional groups (e.g., carboxylic acids, hydroxyl) that are ionizable and, accordingly, charged under certain conditions. A membrane comprising graphene oxide sheets having ionizable functional groups may increase the risk of fouling and/or have limited utility in the separation of certain charged molecules. In some embodiments, a membrane may comprise graphene oxide sheets that have undergone one or more chemical treatments (e.g., chemical reactions) to convert at least a portion of the ionizable functional groups on the graphene oxide sheets to non-ionizable functional groups.

As used herein, the term "ionizable functional group" has its ordinary meaning in the art and may refer to a functional group having a pKa of less than or equal to about 20 in water. In some embodiments, the ionizable functional group may have a pKa of less than or equal to about 15 in water. The term "non-ionizable functional group" has its ordinary meaning in the art and may refer to a functional group have a pKa of greater than about 20 in water.

Figure 11A:
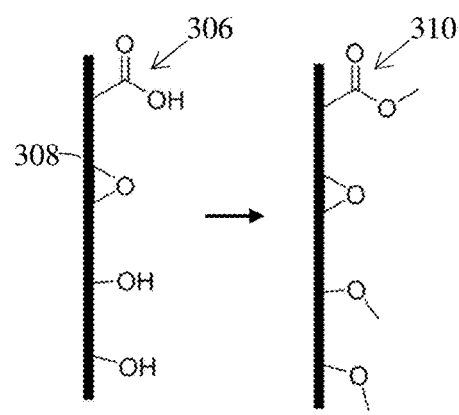
FIG. 11A is a schematic of a method of converting ionizable functional groups to non-ionizable functional group, according to one set of embodiments.
Figure 11B:
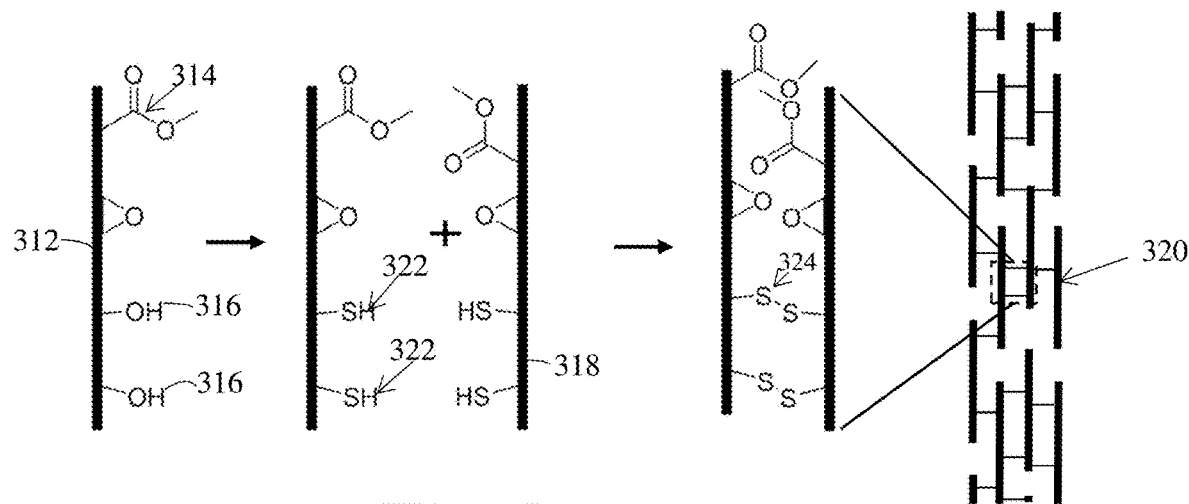
FIG. 11B is a schematic of a method of forming a crosslinked graphene oxide membrane comprising non-ionizable functional groups, according to certain embodiments.

Any suitable chemical reaction may be used to convert an ionizable functional group to a non-ionizable functional group. Non-limiting examples of suitable chemical reactions include alkylation, esterification, hydrogenation, methylation, chlorination, fluorination, bromination, reduction, elimination, and combinations thereof. For example, as shown in FIG. 11A, a carboxylic acid 306 on a graphene oxide sheet 308 may be converted to an ester 310, which is not ionizable. In some embodiments, at least a portion of the ionizable functional groups may be converted to non-ionizable functional groups prior to membrane formation and/or after the formation of chemical linkages, as illustrated in FIG. 11B. In some embodiments, at least a portion of the ionizable functional groups may be converted to non-ionizable functional groups prior to membrane formation. In some such cases, the membrane may not comprise chemical linkages. In other such cases, the membrane may comprise chemical linkages. In such cases, one or more chemical treatments, such as a functional group interconversion reaction and an activation, may be performed after the treatment to convert at least a portion of the ionizable functional groups on graphene oxide sheets to non-ionizable functional groups.

As illustrated in FIG. 11B, a first graphene oxide sheet 312 may have a non-ionizable ester functional group 314 that was formed from an ionizable carboxylic acid. The hydroxyl groups 316 on graphene oxide sheet 312 may be converted to a thiol 322 by exposing the graphene oxide sheet to certain functional group interconversion reaction conditions. The graphene oxide sheet comprising the thiol may be reacted with a second graphene oxide sheet 318 that has undergone similar chemical treatment(s). The thiol on graphene oxide sheet 312 may react with another thiol on second graphene oxide sheet 318 to from a disulfide bond 324 and vice versa. The crosslinked graphene oxide membrane 320 formed from the first and second graphene oxide sheets may be uncharged.

Figure 11C:
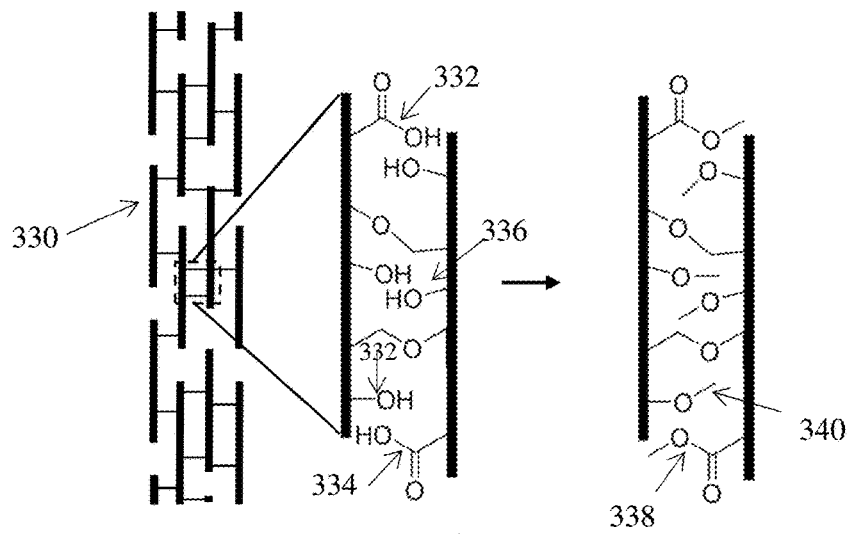
FIG. 11C is a schematic of a method of forming a crosslinked graphene oxide membrane comprising non-ionizable functional groups, according to one set of embodiments.

In some embodiments, at least a portion of the ionizable functional groups may be converted to non-ionizable functional groups after membrane formation as illustrated in FIG. 11C. In certain embodiments, a graphene oxide membrane 330 may comprise ionizable functional groups 332, such as carboxylic acids 334 and hydroxyls 336. In some instances, the membrane may be crosslinked as shown in FIG. 11C. In other embodiments, the membrane may not be crosslinked. Regardless of whether the membrane is crosslinked, the membrane may undergo one or more chemical treatments, such as esterification and alkylation reactions, to convert carboxylic acid 334 into a non-ionizable ester 338 and hydroxyls 336 into non-ionizable groups 340. The conversion of ionizable functional groups to non-ionizable functional groups alone or in combination with other chemical treatments described herein (e.g., crosslinking) may cause the graphene oxide sheets and/or membrane to be relatively uncharged.

In general, the graphene oxide sheets and/or the membrane may undergo any suitable number or type of chemical treatments. In some embodiments, the type of chemical treatments is selected based on the intended application for the membrane. For instance, a membrane for separation of neutral species may not undergo a chemical treatment that imparts charge neutrality. In some embodiments, a membrane intended for use in high pH environments may undergo one or more chemical treatments to produce a membrane having chemical linkages comprising an ether. A membrane that may be exposed to oxidizing agents, such as hypochlorite or peroxide, may undergo one or more chemical treatments to produce a membrane having chemical linkages comprising an ester. As another example, a membrane intended to separate salts may undergo one or more chemical treatments to produce charge neutrality. A membrane that will be used to separate low molecular weight species (e.g., about 250 Da) may undergo one or more chemical treatments to produce a membrane having a relatively small solvent saturated d-spacing. Membranes comprising graphene oxide sheets that have undergone one or more chemical treatments are described in more detail below.

*Membrane and Filter Media Properties

In general, the membranes, described herein, may have broad compatibility, charge neutrality, and/or a relatively high physical stability. In some embodiments, membranes may be a filter media or be part of a filter media. In some such embodiments, the membrane may impart beneficial properties to the filter media.

In some embodiments, a membrane and/or filter media, described herein, may have a relatively high physical stability. For example, the membrane may be a free-standing membrane that does not require a support (e.g., porous support) for physical stability. In general, the thickness, weight percentage of graphene oxide, and/or presence or absence of crosslinking may contribute to the physical stability of the membrane and/or filter media. For instance, a free standing membrane may comprise crosslinked (e.g., covalently crosslinked) graphene oxide sheets, be relatively thick (e.g., thickness of greater than or equal to about 0.5 microns, and have a relatively high weight percentage of graphene (e.g., greater than or equal to about 70%).

In some embodiments, the membrane may be able to withstand relatively high pressures. For instance, in some embodiments, the membrane may be able to withstand greater than or equal to about 10 psi, greater than or equal to about 25 psi, greater than or equal to about 50 psi, greater than or equal to about 100 psi, greater than or equal to about 150 psi, greater than or equal to about 200 psi, greater than or equal to about 250 psi, greater than or equal to about 300 psi, or greater than or equal to about 350 psi pressure differentials without tearing or puncturing when supported only by a glass or stainless steel substrate with 1 mm or larger pores. In some instances, the membrane may be able to withstand less than or equal to about 400 psi, less than or equal to about 350 psi, less than or equal to about 300 psi, less than or equal to about 250 psi, less than or equal to about 200 psi, less than or equal to about 150 psi, greater than or equal to about 100 psi, greater than or equal to about 50 psi, or greater than or equal to about 25 psi pressure differentials without tearing or puncturing when supported only by a glass or stainless steel substrate with 1 mm or larger pores. Combinations of the above-referenced ranges are also possible (e.g., greater than or equal to about 10 psi and less than or equal to about 400 psi).

In some embodiments, a membrane and/or filter media having a relatively high physical stability may be relatively thick. For instance, the thickness of the membrane and/or filter media may be greater than or equal to about 0.1 microns, greater than or equal to about 0.2 microns, greater than or equal to about 0.3 microns, greater than or equal to about 0.4 microns, greater than or equal to about 0.5 microns, greater than or equal to about 0.75 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90. In some instances, the thickness of the membrane and/or filter media may be less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 30 microns, less than or equal to about 10 microns, less than or equal to about 5 microns, less than or equal to about 1 micron, or less than or equal to about 0.5 microns. Combinations of the above-referenced ranges are also possible (e.g., greater than or equal to about 0.1 microns and less than or equal to about 100 microns, greater than or equal to about 0.2 microns and less than or equal to about 100 microns).

Regardless of the thickness of the membrane, the membrane and/or filter media may have a relatively high (e.g., greater than or equal to about 0.1 mL/bar*hr*cm$^2$).

In some embodiments, the membrane and/or filter media having a relatively high physical stability may comprise a relatively high weight percentage of graphene oxide. For instance, in some embodiments, the weight percentage of graphene oxide may be greater than or equal to about 40%, greater than or equal to about 50%, greater than or equal to about 60%, greater than or equal to about 70%, greater than or equal to about 80%, greater than or equal to about 90%, greater than or equal to about 90%, greater than or equal to about 95%, greater than or equal to about 98%, or greater than or equal to about 99%. In some instances, the weight percentage of graphene oxide may be less than or equal to about 100%, less than or equal to about 99%, less than or equal to about 98%, less than or equal to about 95%, less than or equal to about 90%, or less than or equal to about 80%, less than or equal to about 70%, less than or equal to about 60%, or less than or equal to about 50%. Combinations of the above-referenced ranges are also possible (e.g., greater than or equal to about 40% and less than or equal to about 100%, greater than or equal to about 70% and less than or equal to about 100%). In some embodiments, membrane and/or the filter media includes 100% graphene oxide.

In some embodiments, the membrane may comprise less than or equal to about 60% (e.g., less than or equal to about 40%, less than or equal to about 20%, less than or equal to about 10%, less than or equal to about 5%, less than or equal to about 1%) of a non-graphene oxide material. For instance, the membrane may comprise a polymer (e.g., polystyrene, polyethylene, polyethylene oxide, polyethersulfone, polytetrafluoroethylene, polyvinylidene fluoride, polymethylmethacrylate, polydimethylsiloxane, polyester), a carbon-based material (e.g., carbon nanotubes, carbon fibers, graphite), clay, or combinations thereof.

In some embodiments, a membrane and/or filter media comprising graphene oxide sheets may be relatively uncharged. For instance, the magnitude of the zeta potential of the membrane and/or filter media may be less than or equal to about 9 mV, less than or equal to about 8 mV, less than or equal to about 7 mV, less than or equal to about 6 mV, less than or equal to about 5 mV, less than or equal to about 4 mV, less than or equal to about 3 mV, less than or equal to about 2 mV, less than or equal to about 1 mV, less than or equal to about 0.5 mV, or less than or equal to about 0.1 mV at pH 7. In some embodiments, the zeta potential is about 0 at pH 7. In some embodiments, the uncharged membrane and/or filter media may be crosslinked (e.g., covalently crosslinked). In other embodiments, the uncharged membrane and/or filter media may not be crosslinked (e.g., covalently crosslinked). In general, the uncharged membrane and/or filter media, described herein, may be particular useful in desalting application. In some embodiments, uncharged membranes may be particularly useful for application in which the Donnan exclusion principle cannot be used to achieve the desired separation.

In some embodiments, a membrane (e.g., covalently crosslinked membrane), described herein, may have a relatively small dry d-spacing and/or solvent saturated d-spacing. For instance, in some embodiments, a membrane may have an average dry d-spacing and/or solvent saturated d-spacing (e.g., water saturated d-spacing) of less than or equal to about 15 Å, less than or equal to about 14 Å, less than or equal to about 13 Å, less than or equal to about 12 Å, less than or equal to about 11 Å, less than or equal to about 10 Å, less than or equal to about 9 Å, less than or equal to about 8.5 Å, less than or equal to about 8 Å, less than or equal to about 7 Å, less than or equal to about 6 Å, less than or equal to about 5 Å, or less than or equal to about 4 Å. In some instances, the membrane may have an average dry d-spacing and/or solvent saturated d-spacing of greater than or equal to about 3 Å, greater than or equal to about 4 Å, greater than or equal to about 5 Å, greater than or equal to about 6 Å, greater than or equal to about 7 Å, greater than or equal to about 8 Å, greater than or equal to about 9 Å, greater than or equal to about 10 Å, or greater than or equal to about 11 Å. Combinations of the above-referenced ranges are also possible (e.g., greater than or equal to about 7 Å and less than or equal to about 12 Å for dry d-spacing, greater than or equal to about 5 Å and less than or equal to about 15 Å for wet d-spacing). In some embodiments, membranes and/or filter media having a d-spacing when saturated with water of less than or equal to about 12 Å (e.g., less than or equal to about 10 Å, less than or equal to about 9 Å, less than or equal to about 8 Å) may be used in a variety of application. In certain embodiments, a membrane comprising covalently crosslinked graphene oxide sheets that has an average d-spacing when saturated with water of less than or equal to about 9 Å (e.g., less than or equal to about 8 Å) may be useful for nanofiltration applications.

In some embodiments, the difference between the dry d-spacing and the solvent saturated d-spacing may be relatively small. For instance, in some embodiments, the difference between the dry d-spacing and the solvent saturated d-spacing (e.g., water saturated d-spacing) may be less than or equal to about 8 Å, less than or equal to about 7 Å, less than or equal to about 6 Å, less than or equal to about 5 Å, less than or equal to about 4 Å, less than or equal to about 3 Å, less than or equal to about 2 Å, less than or equal to about 1.5 Å, less than or equal to about 1.0 Å, less than or equal to about 0.8 Å, less than or equal to about 0.5 Å, less than or equal to about 0.3 Å, or less than or equal to about 0.1 Å.

In some embodiments, a membrane and/or filter media described herein may have a relatively low molecular weight cutoff. In some embodiments, it is believed that the molecular weight cutoff is due primarily (e.g., solely) to physical separation (e.g., size exclusion). In such embodiments, separation may not be due to chemical processes. In some embodiments, the molecular weight cutoff may be less than or equal to about 700 g/mol, less than or equal to about 600 g/mol, less than or equal to about 500 g/mol, less than or equal to about 400 g/mol, less than or equal to about 300 g/mol, or less than or equal to about 250 g/mol.

In general, membranes compatible with a broad range of environments may be produced through selection of appropriate chemical treatment(s). For instance, in some embodiments, a membrane and/or filter media may have a broad compatible pH range, a relatively high maximum compatible pH, and a relatively low minimum compatible pH. As used herein, the term "maximum compatible pH" refers to the highest pH in which the membrane and/or filter media is compatible. The term "minimum compatible pH" refers to the lowest pH in which the membrane and/or filter media is compatible. The term "compatible pH range" refers to the range of pH values in which the membrane and/or filter media is compatible. In some embodiments, compatibility in various pH environments may be imparted by appropriate selection of the chemical moieties in the chemical linkages used to crosslink the graphene oxide. For example, chemical linkages comprising an ether may produce a membrane and/or filter media having a broad compatible pH range.

In some embodiments, membranes and/or filter media, described herein, may have a broad compatible pH range. For instance, in certain membranes and/or filter media, the compatible pH range may be at least about 5 to about 8, at least about 4 to about 8, at least about 3 to about 8, least about 2 to about 8, or at least about 1 to about 8. In certain membranes and/or filter media, the compatible pH range may be at least about 5 to about 8, at least about 5 to about 9, at least about 5 to about 10, at least about 5 to about 11, least about 5 to about 12, at least about 5 to about 13, or at least about 5 to about 14. In some embodiments, the compatible pH range of a membrane and/or filter media may be at least about 5 to about 8, at least about 4 to about 9, at least about 3 to about 10, least about 2 to about 11, at least about 1 to about 12, least about 1 to about 13, or at least about 1 to about 14.

In some embodiments, membranes and/or filter media, described herein, may have a relatively high maximum compatible pH. For instance, in certain embodiments, the maximum compatible pH may be greater than or equal to about 8, greater than or equal to about 8.5, greater than or equal to about 9, greater than or equal to about 9.5, greater than or equal to about 10, greater than or equal to about 10.5, greater than or equal to about 11, greater than or equal to about 11.5, greater than or equal to about 12, greater than or equal to about 12.5, or greater than or equal to about 13. In some instances, the maximum compatible pH may be less than or equal to about 14, less than or equal to about 13.5, less than or equal to about 13, less than or equal to about 12.5, less than or equal to about 12, or less than or equal to about 11.5, less than or equal to about 11, less than or equal to about 10.5, less than or equal to about 10, or less than or equal to about 9.5. Combinations of the above-referenced ranges are also possible (e.g., greater than or equal to about 8 and less than or equal to about 14).

In some embodiments, membranes and/or filter media, described herein, may have a relatively low minimum compatible pH. For instance, in certain embodiments, the minimum compatible pH may be less than or equal to about 5, less than or equal to about 5.5, less than or equal to about 5, less than or equal to about 4.5, less than or equal to about 4, or less than or equal to about 3.5, less than or equal to about 3, less than or equal to about 2.5, less than or equal to about 2, or less than or equal to about 1.5. In some instances, the minimum compatible pH may be greater than or equal to about 1, greater than or equal to about 1.5, greater than or equal to about 2, greater than or equal to about 2.5, greater than or equal to about 3, greater than or equal to about 3.5, greater than or equal to about 4, or greater than or equal to about 4.5. Combinations of the above-referenced ranges are also possible (e.g., greater than or equal to about 1 and less than or equal to about 5).

In some embodiments, membrane and/or filter media, described herein, may be compatible with elevated temperatures. In some embodiments, the maximum operating temperature in water having a pH of 7 may be greater than or equal to about 65° C., greater than or equal to about 75° C., greater than or equal to about 85° C., greater than or equal to about 100° C., greater than or equal to about, greater than or equal to about 125° C., greater than or equal to about 150° C., greater than or equal to about 175° C., greater than or equal to about 200° C., greater than or equal to about 225° C., greater than or equal to about 250° C., or greater than or equal to about 275° C. In some instances, the maximum operating temperature in water having a pH of 7 may be less than or equal to about 300° C., less than or equal to about 275° C., less than or equal to about 250° C., less than or equal to about 225° C., less than or equal to about 200° C., or less than or equal to about 175° C., less than or equal to about 150° C., less than or equal to about 125° C., less than or equal to about 100° C., or less than or equal to about 90° C. Combinations of the above-referenced ranges are also possible (e.g., greater than or equal to about 65° C. and less than or equal to about 300° C.).

In general, membranes compatible with a broad range of oxidizing agents and solvents may be produced through selection of appropriate chemical treatment(s). For instance, in some embodiments, compatibility with oxidizing agents may be imparted by appropriate selection of the chemical moieties in the chemical linkages used to crosslink the graphene oxide. For example, chemical linkages comprising an ester, an ether, an alkane, and/or a fluoroalkane may produce a membrane and/or filter media having a compatibility with a wide variety of oxidizing agents. For instance, the membrane and/or filter media, described herein, may be compatible with oxidizing agent used in water treatment (e.g., hypochlorite). As another example, the membrane and/or filter media, described herein, may be compatible with oxidizing agent used to clean filter media that have fouling. In some embodiments, the membrane and/or filter media may be compatible with one or more oxidizing agent selected from the group consisting of peroxides, hypochlorite, chlorine dioxide, peroxy acids, chloroxides, and combinations thereof.

In some embodiments, a membrane and/or filter media, described herein may be compatible with a wide variety of solvents. For instance, the membrane and/or filter media, described herein, may be compatible with chlorinated solvents. As another example, the membrane and/or filter media, described herein, may be compatible with non-polar solvents. In some embodiments, the membrane and/or filter media may be compatible with one or more solvents selected from the group consisting of polar solvents, nonpolar solvents, protic solvents, aprotic solvents, chlorinated solvents, aromatic solvents, and combinations thereof. In certain embodiments, the membrane and/or filter media may be compatible with alkane, alcohol, acid, chlorinated organic, sulfone, amide, and aromatic solvent.

As described herein, the graphene oxide membranes and/or the associated filter media may be designed and fabricated to achieve a desired degree of filtration, or species rejection. In some embodiments, the membrane and/or filter media may exhibit a species rejection in the range of about 30% to about 100%, about 40% to about 100%, about 50% to about 100%, about 60% to about 100%, about 70% to about 100%, about 80% to about 100%, or about 90% to about 100%, upon contact with a solution comprising a species. In some embodiments, the membrane and/or filter media material exhibits a species rejection in the range of about 99% upon contact with a solution comprising a species. In some embodiments, the membrane and/or filter media exhibits a species rejection in the range of about 100% upon contact with a solution comprising a species. The rejection of the membrane may be measured by using a molecule greater than the molecular weight cutoff (e.g., methylene blue) and a molecule smaller than the molecular weight cutoff (e.g., NaCl, monovalent ion). An appropriate technique, such as ultraviolet-visible spectroscopy (e.g., ratio at 588 nm) and conductivity, may be used to measures the relative concentration of the feed and permeate streams to calculate rejection UV-vis.

Another advantageous feature of materials and methods described herein is enhanced resistance to fouling. Fouling refers to the gradual accumulation of undesired matter on the surface of a membrane, and has been shown to occur on materials having relatively rough topographies and/or on oxygen-containing surfaces that favor organic matter growth. Some embodiments described herein provide relatively uncharged membranes that can present improved resistance to fouling, resulting in longer plant uptime, longer life of the membrane, lower driving pressures, and the like.

In some cases, the membranes and/or filter media may be utilized in the filtration of various solutions and/or suspensions, including beverages (e.g., milk), pharmaceutical streams, chemical streams, aqueous solutions (e.g., seawater, brackish water, waste water). For example, a solution comprising a fluid carrier and a plurality of species (e.g., plurality of retentate species) may be placed in contact with a first side of the membrane. As described herein, the membrane may contain interlayer spacing (e.g., d-spacing) that are sized to substantially prevent at least a portion of the species from traversing the membrane through the interlayer spacing, i.e., flowing from the first side of the membrane and to a second, opposing side of the membrane through the interlayer spacing. In some embodiments, the solution may include one or more types of species (e.g., retentate species, a permeate species). In some such embodiments, the membrane may contain an average interlayer spacing that is sized to substantially prevent at least a portion of the retentate species from traversing the membrane through the interlayer spacing, while allowing at least a portion (e.g., substantially all) of the permeate species to traverse the membrane. In some cases, the permeate and/or retentate species may include a charged species (e.g., an ion). For example, the retentate species may include one or more metal ions ($Mg^{2+}$). In some cases, the permeate species may be an inorganic salt (e.g., NaCl). In certain cases, the permeate species is an inorganic species having a net charge. In some cases, the retentate species may be a sugar (e.g., lactose) and/or a protein (e.g., whey). In some embodiments, a filtration method may comprise contacting a membrane with a mixture comprising a fluid, an organic species, and an inorganic species having a net charge, and passing the fluid and the inorganic species having a net charge through the membrane, while retaining at least a portion of the organic species.

In certain embodiments, the graphene oxide membranes and/or filter media described herein, may be particularly well-suited for the separation of relatively low molecular weight species. For instance, the graphene oxide membranes and/or filter media may be used to separate a first species having a molecular weight of greater than or equal to about 250 g/mol and a second species having a molecular weight of less than about 250 g/mol. In some such embodiments, the filtration method may comprise contacting a membrane comprising crosslinked graphene oxide sheets with a mixture comprising a fluid, the first species, and the second species, and passing the fluid and the second species through the membrane, such that at least a portion of the first species is rejected by the membrane. In some cases, the first species is an organic species. In certain cases, the second species is an ionic compound or an inorganic species having a net charge.

In some cases, the membrane may be configured and arranged for the desalination of water. For example, membranes as described herein may enable a series of new devices and processes beyond the cylindrical cross-flow systems typically employed in nanofiltration, ultrafiltration, and reverse osmosis. In some cases, increased water permeability and fouling/scaling resistance of the membranes can allow for the use of dead-end filtration modules in which the direction of feed water flow is perpendicular to the membrane surface, rather than parallel to it as in cross-flow systems, with advantages for water recovery, system footprint, and energy consumption. In addition, the relatively higher permeability of the membranes described herein may allow for large-scale and economical application of shear-enhanced membrane filtration, a process in which membranes are coupled to a rotating or vibrating device in order to increase the shear rate at the water-membrane interface, thereby reducing the effects of concentration polarization. In some cases, the high permeability of membranes may enable the use of shear-enhanced systems with high water throughput with reduced membrane area and correspondingly small devices.

In some embodiments, membranes, described herein, may be configured and arranged in a filtration apparatus for the filtration of various solutions. In one set of embodiments, a graphene oxide membrane may be assembled into a spiral-wound membrane. The layered assembly may then be rolled into a spiral and assembled into a membrane element with end caps. The resulting spiral-wound membrane can be inserted in a conventional NF/UF/reverse osmosis water production skid, or employed in alternative applications.

Without wishing to be bound by theory, the graphene oxide membrane described herein may be capable of excluding various species by one or more physical exclusion mechanisms. In some cases, the mechanism may be size exclusion, i.e., interlayer spacing having an effective diameter that is narrower than that of the species may physically force the species to remain on the feed side of the membrane. Typically, the effective diameter of the species may correspond to, in the case of ions, the solvated diameter of the species, and, in the case of uncharged solutes, the van der Waals radius of the species.

In general, crosslinked graphene oxide membranes may be formed by any suitable process provided that the crosslinking occurs at a particular time during membrane formation. In certain embodiments, crosslinking should occur while the sheets are being assembled into layers. In some such embodiments, crosslinking only occurs during membrane formation. For instance, in embodiments in which a membrane is formed from a mixture comprising a fluid and the graphene oxide sheets, the crosslinking step may occur during removal of the fluid. For example, a method of forming a graphene oxide membrane may comprise providing a mixture comprising graphene oxide sheets and a fluid, removing at least a portion of the fluid (e.g., at least about 90%) from the mixture while crosslinking at least a portion of the graphene oxide sheets. In some embodiments, the crosslinking step comprises reacting at least a portion of the functional groups on at least some of the graphene oxide sheets with each other. In general, any suitable method may be used to remove the fluid and assemble the sheets into layers. In some embodiments, vacuum filtration may be used to remove the fluid and assemble the sheets.

In some embodiments, a porous material comprising crosslinked graphene oxide sheets may be formed. In some such embodiments, the graphene oxide sheets may be crosslinked as described herein, except crosslinking may occur before, during, and or after formation of the porous material. In some embodiments, in which crosslinking occurs before, during, and/or after formation of the porous material (e.g., assembly of the graphene oxide layers), a relatively high concentration of crosslinking reagents may be used while the sheets are being assembled into layers. In some such embodiments, crosslinking only occurs before and/or during assembly of the graphene oxide layers.

In some embodiments, the porous material may have pores that are larger than the average interlayer spacing between the graphene oxide sheets. For instance, the porous may have average pore size greater than or equal to about 0.002 microns, greater than or equal to about 0.005 microns, greater than or equal to about 0.01 microns, greater than or equal to about 0.025 microns, greater than or equal to about 0.05 microns, greater than or equal to about 0.1 microns, greater than or equal to about 0.5 micron, greater than or equal to about 1 micron, greater than or equal to about 5 microns, greater than or equal to about 10 microns, greater than or equal to about 25 microns, greater than or equal to about 50 microns, greater than or equal to about 100 microns, greater than or equal to about 200 microns, greater than or equal to about 300 microns, greater than or equal to about 400 microns, greater than or equal to about 500 microns, greater than or equal to about 600 microns, greater than or equal to about 700 microns, greater than or equal to about 800 microns, or greater than or equal to about 900. In some instances, the average pore size may be less than or equal to about 1,000 microns, less than or equal to about 900 microns, less than or equal to about 800 microns, less than or equal to about 700 microns, less than or equal to about 600 microns, less than or equal to about 500 microns, less than or equal to about 400 microns, less than or equal to about 300 microns, less than or equal to about 200 microns, less than or equal to about 100 microns, less than or equal to about 50 microns, less than or equal to about 10 microns, less than or equal to about 5 microns, less than or equal to about 1 microns, less than or equal to about 0.5 microns, less than or equal to about 0.1 microns, or less than or equal to about 0.05 microns. Combinations of the above-referenced ranges are also possible (e.g., greater than or equal to about 0.002 microns and less than or equal to about 1,000 microns, greater than or equal to about 0.5 microns and less than or equal to about 10 microns). In general, the thickness of the membrane is greater than the average pore size.

In some embodiments, the porous material may have a relatively high weight percentage of graphene oxide. For instance, in some embodiments, the weight percentage of graphene oxide may be greater than or equal to about 40%, greater than or equal to about 50%, greater than or equal to about 60%, greater than or equal to about 70%, greater than or equal to about 80%, greater than or equal to about 90%, greater than or equal to about 90%, greater than or equal to about 95%, greater than or equal to about 98%, or greater than or equal to about 99%. In some instances, the weight percentage of graphene oxide may be less than or equal to about 100%, less than or equal to about 99%, less than or equal to about 98%, less than or equal to about 95%, less than or equal to about 90%, or less than or equal to about 80%, less than or equal to about 70%, less than or equal to about 60%, or less than or equal to about 50%. Combinations of the above-referenced ranges are also possible (e.g., greater than or equal to about 40% and less than or equal to about 100%, greater than or equal to about 70% and less than or equal to about 100%). In some embodiments, porous material includes 100% graphene oxide.

In general, a crosslinked graphene oxide membrane has chemical linkages that attach graphene sheets other graphene sheets. The chemical linkage may use covalent bonds and/or noncovalent bonds to form the attachment between the graphene oxide sheets.

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, N Y, 1962); and Wilen, S. H. *Tables of Resolving Agents and Optical Resolutions* p. 268 (E. L. Eliel, Ed., Univ. of Notre Dame Press, Notre Dame, Ind. 1972). The invention additionally encompasses compounds as individual isomers substantially free of other isomers, and alternatively, as mixtures of various isomers.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}$F with $^{18}$F, or the replacement of a carbon by a $^{13}$C- or $^{14}$C-enriched carbon are within the scope of the disclosure. Such compounds are useful, for example, as analytical tools or probes in biological assays.

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6, or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "haloalkyl" denotes an alkyl group, as defined above, having one, two, or three halogen atoms attached thereto and is exemplified by such groups as chloromethyl, bromoethyl, trifluoromethyl, and the like.

The term "amino" or "amine," as used herein, refers to a primary (—$NH_2$), secondary (—$NHR_x$), tertiary (—$NR_xR_y$), or quaternary (—$N^+R_xR_yR_z$) amine, where $R_x$, $R_y$, and $R_z$ are independently an aliphatic, alicyclic, heteroaliphatic, heterocyclic, aryl, or heteroaryl moiety, as defined herein. Examples of amine groups include, but are not limited to, methylamine, dimethylamine, ethylamine, diethylamine, methylethylamine, iso-propylamine, piperidine, trimethylamine, and propylamine.

As used herein, the term "hydroxyl" or "hydroxy" refers to the group —OH.

As used herein, the term "thiol" or "thio" refers to the group —SH.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether proceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

The following examples are intended to illustrate certain embodiments of the present invention, but do not exemplify the full scope of the invention.

Example 1

This example describes the formation and performance of crosslinked graphene oxide (i.e., GO) membranes.

The structure of GO was studied. From these experiments, two critical features were identified: first, graphene oxide membranes are not stable in water when flakes are held together only by van der Waals forces and second, the interlayer spacing could serve as the size exclusion mechanism for a GO membrane while maintaining fast flux. The interlayer spacing of a GO film is dictated by the attractive van der Waals forces between the flakes, and is affected by the humidity of the environment during film formation. This interlayer distance is typically between 7 and 9 Å for graphene oxide, as measured by the 2-theta peak of X-Ray Diffraction. Unoxidized graphite exhibits ABA stacking of the graphene layers and an associated lower d-spacing of about 3.6 A. Reduced graphene oxide also show a less-ordered 2-theta peak, but does not necessarily stack in ABA formation. In all cases, there is no chemical bond between individual flakes, laterally or vertically. When hydrated (saturated in water), the inter-layer spacing swells because GO is hydrophilic and intercalated water further separates the sheets.

In this example, graphene functionalization chemistry was leverage to create stable cross-linkers that maintained sub-nanometer interlayer flake spacing in vacuum filtrated films when dry and wet. It was demonstrated that interlayer spacing can remain below 1 nm after cross-linking, even when hydrated. Nanofiltration of 1.5 nm diameter contaminants and that the membrane can withstand water flow up to 60 psi with no detrimental effect was also demonstrated. The effect of chlorine on the membrane's integrity as a membrane material was also shown.

Figure 12:
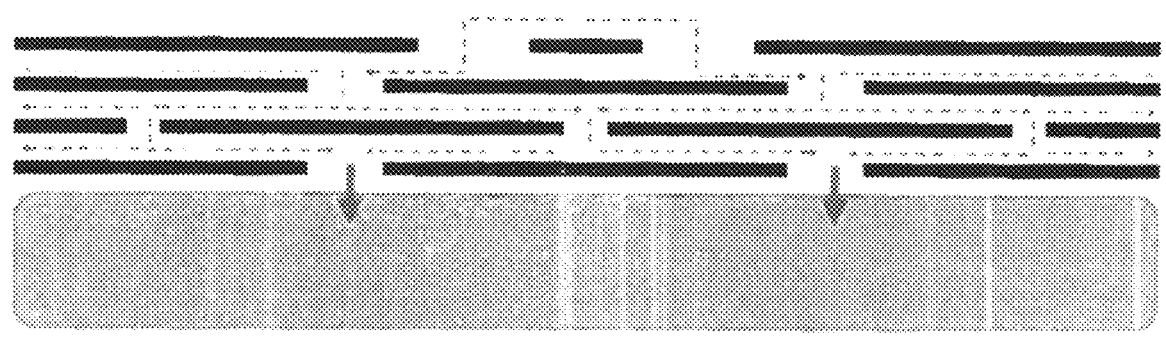
FIG. 12 is a schematic of fluid flow through a graphene oxide membrane, according to certain embodiments.

In order for GO to be a viable separation membrane for water desalination, gas separation, oil-water emulsions or other industrial processes, the GO must be modified to maintain stable films assembled through scalable methods. In contrast to graphene, GO can be assembled from solution into large area sheets using methods such as vacuum filtration, spin casting, spray casting, dip casting, drop casting or Langmuir-Blot film formation. The mechanism of flow through a GO membrane is thought to be both lateral and vertical via its interlayer spacing and defects, through both surface charge interactions and size-exclusion. FIG. 12 shows schematic of the mechanism of water flow through a multi-layer GO membrane. The interlayer spacing, or d-spacing, is the critical dimension for size-exclusion solute rejection.

Graphene oxide is viewed as the scalable alternative to graphene solution processable in its production and relatively inexpensive in its feedstock. However, GO is strongly hydrophilic and does not form stable dispersions in water. Accordingly, it does not form stable papers in water either. In order to overcome the challenge of water dispersion, chemical functionalization of the GO basal plane and edges has been developed. Separation applications also rely on the high permeabilities that have been observed for graphene oxide films. It has been reported that GO exhibits 300 times the permeability than diffusion alone, which dictates limits in permeability for solution-diffusion polymer membranes. It has been observed that reduced graphene oxide is 100 times less permeable to flow than the original graphene oxide, attributed to the reduction in inter-layer spacing from 10 Å to 4 Å. But the exact reason for this increased permeability is not fully understood. The theoretical flux has been calculated for ultra-thin membranes using the Hagan-Poiseuille Equation to find a value that is four orders of magnitude lower than the observed experimental fluxes. Two possible explanations exist: (1) the H-P Equation does not account for the defects in the graphene oxide lattice that could make the effective lateral dimension of each flake smaller, and (2) the fundamental assumption of the H-P equation is that flow is laminar and no-slip. Similarly high fluxes have been observed in carbon nanotubes with diameters less than 10 nm, either due to low friction between the water and the hydrophobic wall or due to ordered hydrogen bonds due to a single file row of water molecules. The Hagan-Poiscuille equation is described as:

$$Q = \frac{h^4 \Delta P}{12L^2 \eta \Delta x}$$

where Q is the flux, h or height correlates to the inter-layer spacing, ΔP is the pressure drop across the membrane, L is the length of the GO sheets, η is the viscosity of water, and Δx refers to the thickness of the membrane. However, because graphene oxide is hydrophilic due to the regions of oxygen functionalities, only the ordered sp2 regions contribute to the low-friction condition. In this example, base-reduced GO membranes exhibited twice the flow than the GO, suggesting a decrease in the hydrophilicity of the flakes. In order to further investigate the no-slip theory, the previous work also measured the flux through the membrane for increasingly hydrophilic liquids. As expected, flux increased with hydrophilicity of the liquid, supporting this no-slip theory. The interlayer spacing is dependent on film formation method as well as ambient processing conditions, particularly humidity, though typically ranges from 7-9 Å.

Moreover, GO films swell when exposed to moisture, as water molecules permeate between sheets and increase the interlayer spacing to about 1.3 nm. Ultimately, this leads to films that are unstable in water without a form of cross-linker.

To be an effective size exclusion desalination membrane, simulations and experiments show the need for sub-nanometer spacing (6-7 Å). In this example, a cross-linked GO membrane was designed to have 7 Å spacing both when dry and when saturated with water. A process for the film formation and cross-linking chemistry to make stable membranes without pinholes or cracks was developed. Moreover, a 32% rejection of methylene blue was developed, which has a hydrated diameter of about 1.5 nm. With demonstrated stability of 7 Å spacing, the potential of increasing rejection of each with further film formation optimization is likely.

Figure 13:
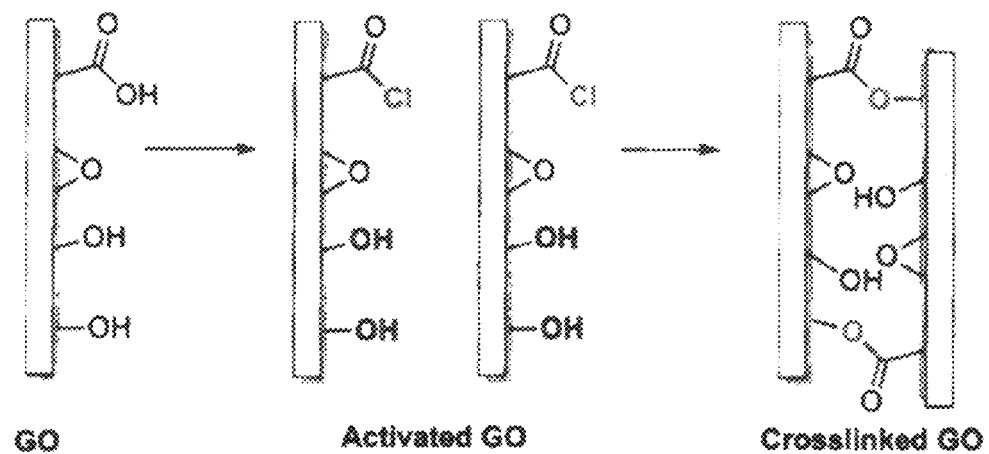
FIG. 13 is a schematic of a method of forming a crosslinked graphene oxide membrane, according to one set of embodiments.
Figure 14:
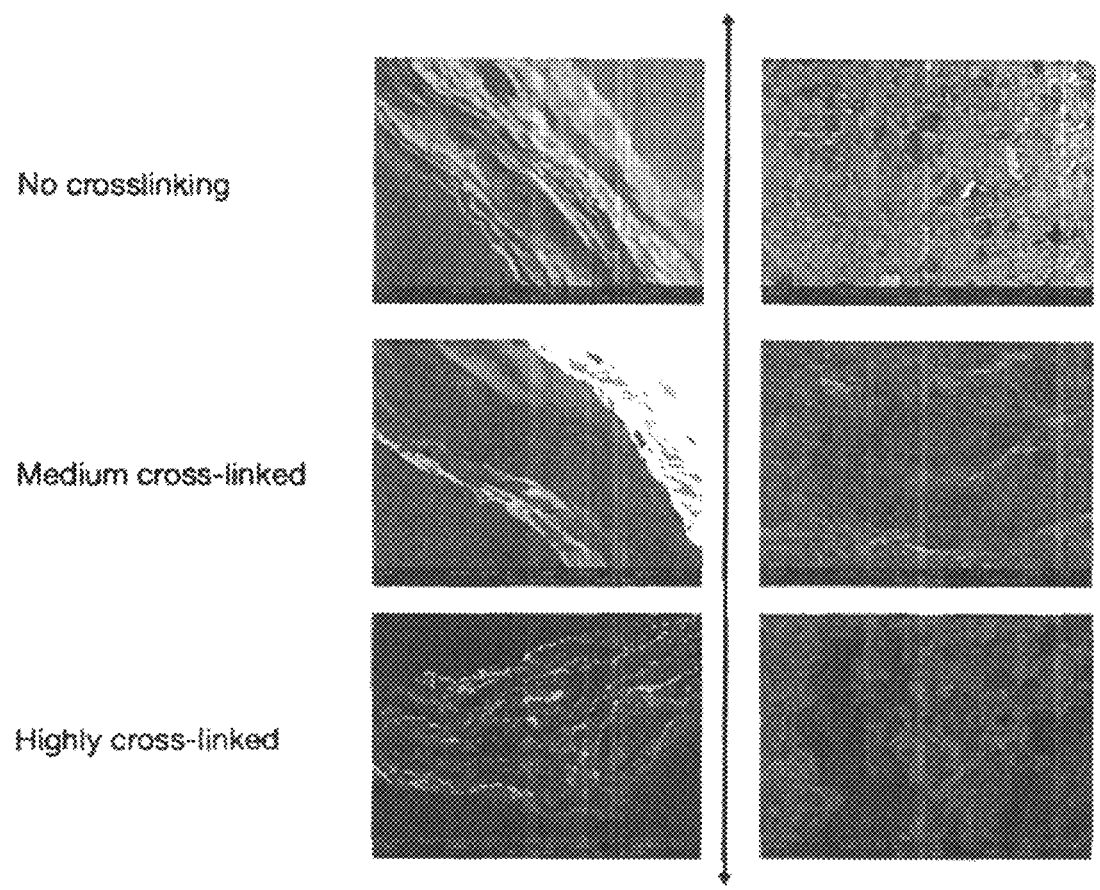
FIG. 14 is scanning electron microscopy images of graphene oxide membranes having different degrees of crosslinking, according to certain embodiments.
Figure 15:
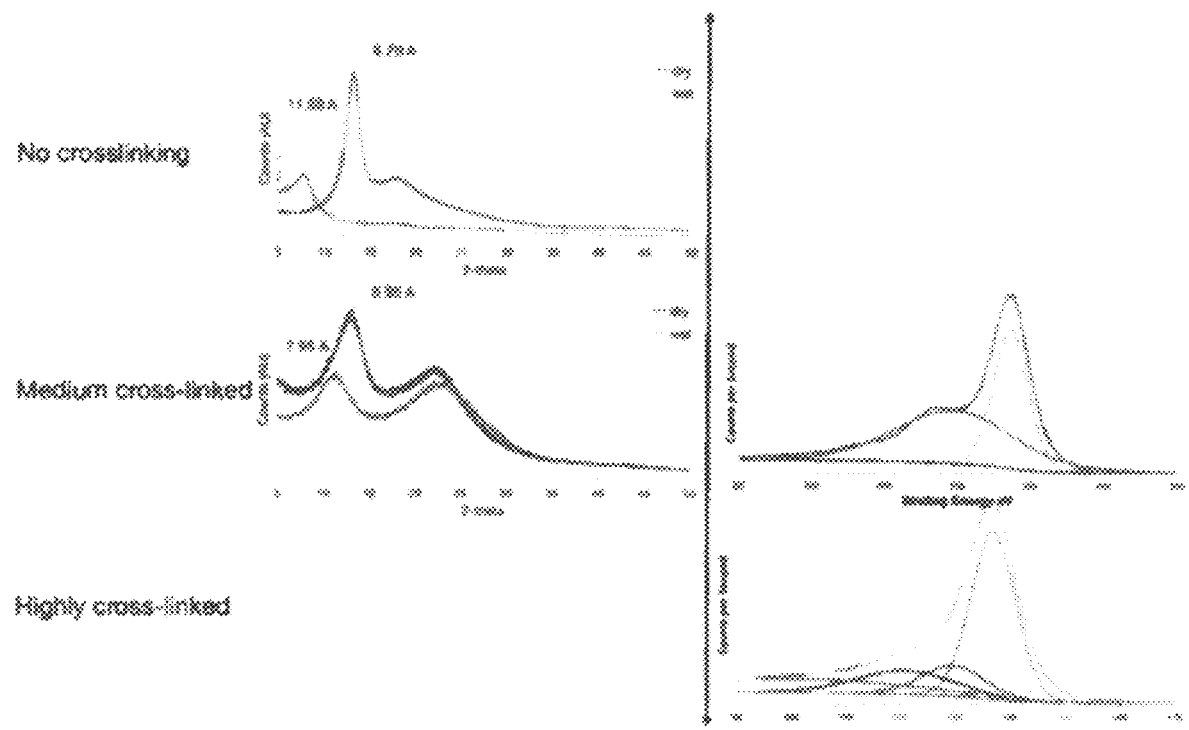
FIG. 15 is X-ray diffraction spectra (left) of graphene oxide membranes having different degrees of crosslinking and X-ray photoelectron spectroscopy spectra (right) of graphene oxide membranes having different degrees of crosslinking, according to one set of embodiments.

In order to achieve sub-nanometer spacing, a cross-linker method with the fewest number of bonds between GO sheets was used. Unlike graphene, GO has the chemical advantage of functional groups, so disruption of the sp2 lattice is not required. In particular, the non-stoichiometric structure of GO includes epoxides and hydroxyl groups on the basal plane, with both carboxylic acid and hydroxyls terminating the edges. Shown in FIG. 13, oxalyl chloride was used to activate the edge carboxylic acid groups on GO and triethylamine to link these activated sites to hydroxyl groups on the basal plane, resulting in just three bond-lengths. A parameter to creating a stable film using this cross-linking method is the degree of cross-linking of the system, which is dependent both on concentration of GO in solution, the concentration of cross-linkers, and the mixing of the solution. Highly cross-linked GO is extremely stable in its hydrated state, but produces a porous foam. Vacuum filtrated GO exhibits a very planar morphology when it is not cross-linked at all but swells to about twice its original. Film coverage optimization depends on the concentration of cross-linkers and the dilution of the GO process both during cross-linking and during film assembly, shown in FIG. 14. FIG. 14 shows the parameter optimization results in a range of degrees of cross-linking as shown in terms of the planar morphology in SEM. When reacted in a concentrated solution, the graphene oxide sheets produced a foam-like clumped structure that holds its d-spacing when wet. When reacted during the vacuum filtration process, the sheets assembled into a much more planar configuration, but demonstrated swelling when wet. When reacted immediately before the filtration was applied, a stable film could be formed. FIG. 15 illustrates that the degree of cross-linking can be quantified both by the relative amounts of swelling of the film when exposed to water as shown with the XRD spectra on the left, as well as the intensity of the C—O peak around 288 cV in the XPS spectra shown on the right. The two processes both showed an increase in covalent bonds, some residual chlorine (1%), and reduced oxygen functionalization when analyzed with XPS. The foam demonstrated a higher percentage of C═C bonds (284.5 cV) as well as a lower oxygen content, with the residual second peak in the film attributed to epoxy groups. The as-produced film has a 2:1 carbon to oxygen ratio, which is typical for graphene oxide. The foam has been reduced to 6.5:1 while the optimized film is 5.8:1. As a result, it appeared that the degree of cross-linking can be correlated with the degree of oxygen reduction in the sample.

Figure 16:
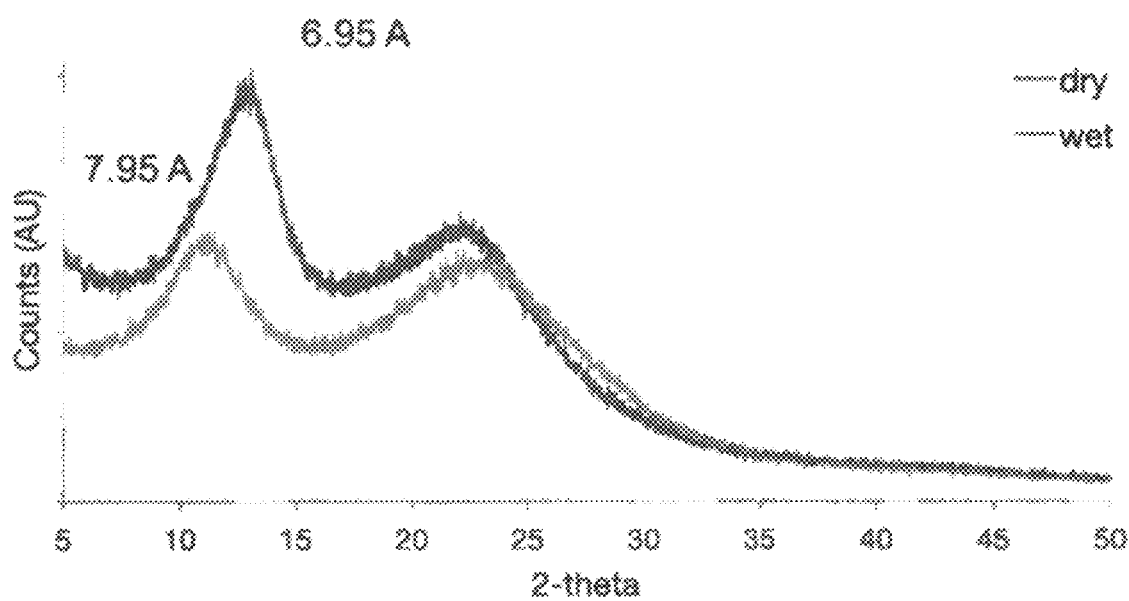
FIG. 16 is an X-ray photoelectron spectroscopy spectrum of a dry crosslinked graphene oxide membrane and a crosslinked graphene oxide membrane that is saturated with water, according to certain embodiments.

The interlayer d-spacing of the flakes is measured using X-Ray Diffraction (XRD). The 2-theta peak in XRD corresponds to the spacing. While as-produced GO swelled from 7 to 12 Å when saturated with water, the 2-theta peak only shifted from 7 to 8 Å for the cross-linked sample 4-6. FIG. 16 shows that the cross-linked sample maintained a sub-nanometer interlayer spacing even while saturated with water. It swelled from 6.95 Å to 7.95 Å when wet. This was important to the stability of the membrane in water. The foam by contrast maintained a 6.5 Å spacing when hydrated, while the low degree of cross-linking samples swelled from 7 to 10 Å. The fact that degree of cross-linking appeared to affect the swelling suggested that there were multiple mechanisms of this reaction that are occurring.

Raman spectroscopy provided evidence of the chemical and structural changes due to the cross-linking process. The spectrum showed the evolution of shoulders onto the characteristic D and G peaks for graphene oxide at 1120 cm-1 and 1500 cm-1, which could have represented the carbon single bonds in the linker. This data could serve as an inexpensive method to measure the cross-linking in GO membranes.

Figure 17:
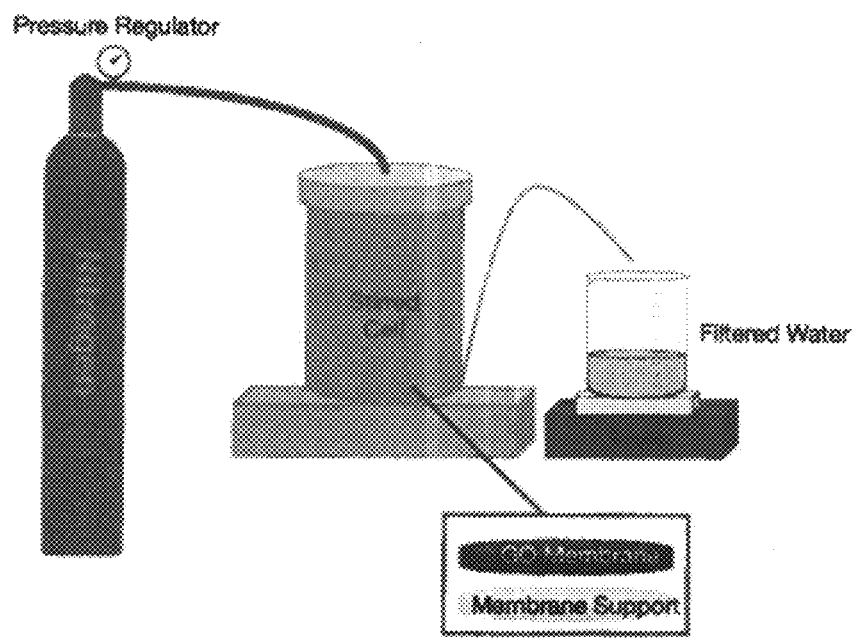
FIG. 17 is a schematic of a stirred cell setup used to measure the flux and rejection of graphene oxide membranes, according to one set of embodiments.
Figure 18A:
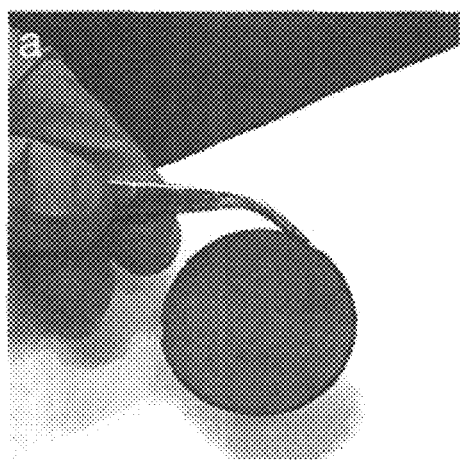
FIG. 18A is an image of a crosslinked graphene oxide membranes, according to certain embodiments.
Figure 18B:
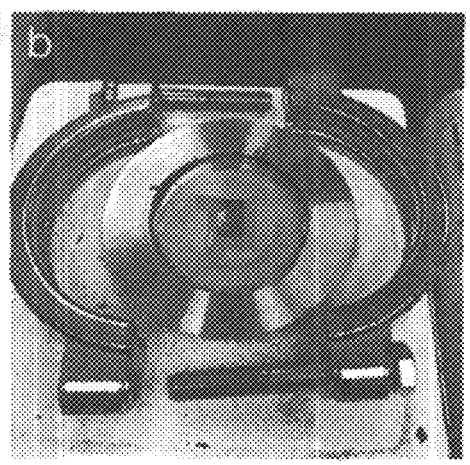
FIG. 18B is an image of a crosslinked graphene oxide membrane in the stirred cell setup, according to one set of embodiments.

Membranes were tested for permeability and selectivity using a dead-end stirred cell pressured with nitrogen gas to 30 psi. The membrane was suspended and scaled over an impermeable Parafilm support using kapton tape, and tested for leaks. The experimental setup is shown in FIGS. 17, 18A, and 18B. FIG. 17 shows a schematic of the stirred cell setup used to measure the flux and rejection of GO membranes. FIG. 18A shows the GO membrane was formed in a 45 mm diameter vacuum filtration apparatus. It was then cut using a clean and sharp blade into small areas to test and suspended over a slit sheet of Parafilm in the stirred-cell setup as shown in FIG. 18B. Kapton tape was used to seal the membrane. The Parafilm was placed directly on the stainless steel support of the stirred cell.

Figure 19:
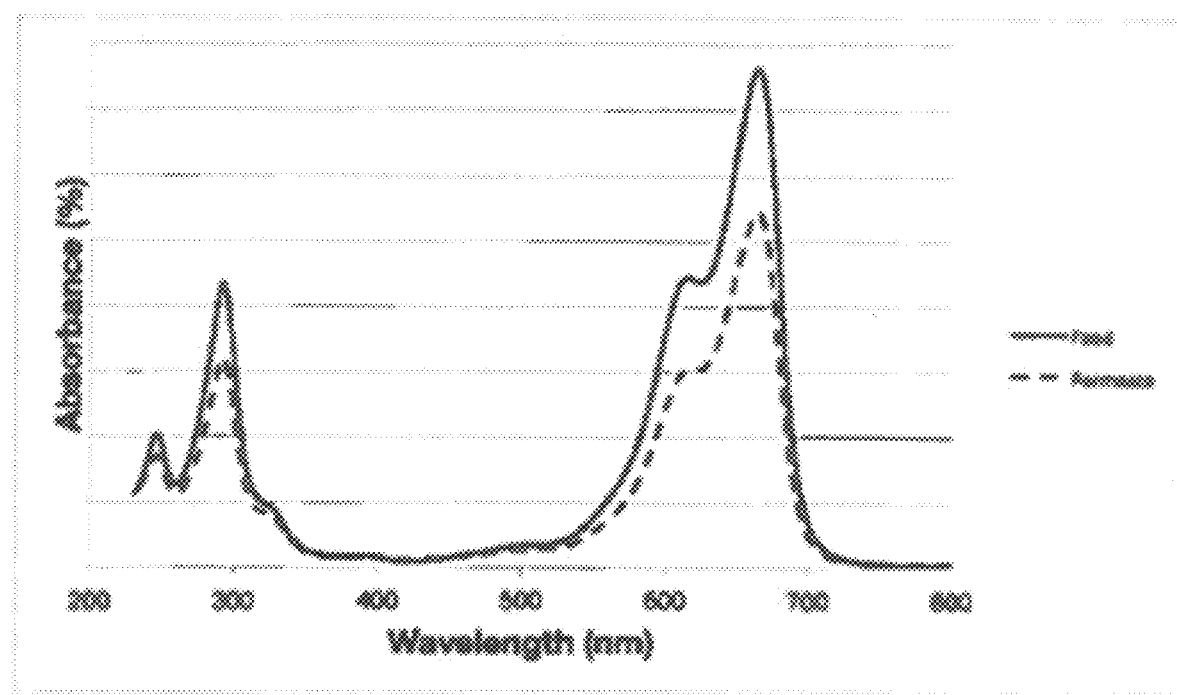
FIG. 19 is an ultraviolet-visible spectra of the feed and permeate from a crosslinked graphene oxide membrane, according to certain embodiments.

All membranes were subjected to the solution at pressure (30 psi) for 2 hours before rejection data was collected to control for adsorption. Flux measurements were collected using a bench counting scale and were not considered until flux had reached a linear steady state. The rejection of ions was detected by conductivity measurements, which correlate with salinity. The rejection of organic dyes was determined using a Cary UV-Visible Spectrophotometer to measure transmittance of feed and permeate solutions at 590 nanometers. An example of the full collected spectra is shown in FIG. 19. FIG. 19 shows UV-visible spectra for the feed and permeate that was collected for the range of 200 to 800 nanometers in order to generate a stable zero background. The amount of MB in the solution was determined by the absorbance at 590 nm. In this case, there was 32% rejection.

Figure 20:
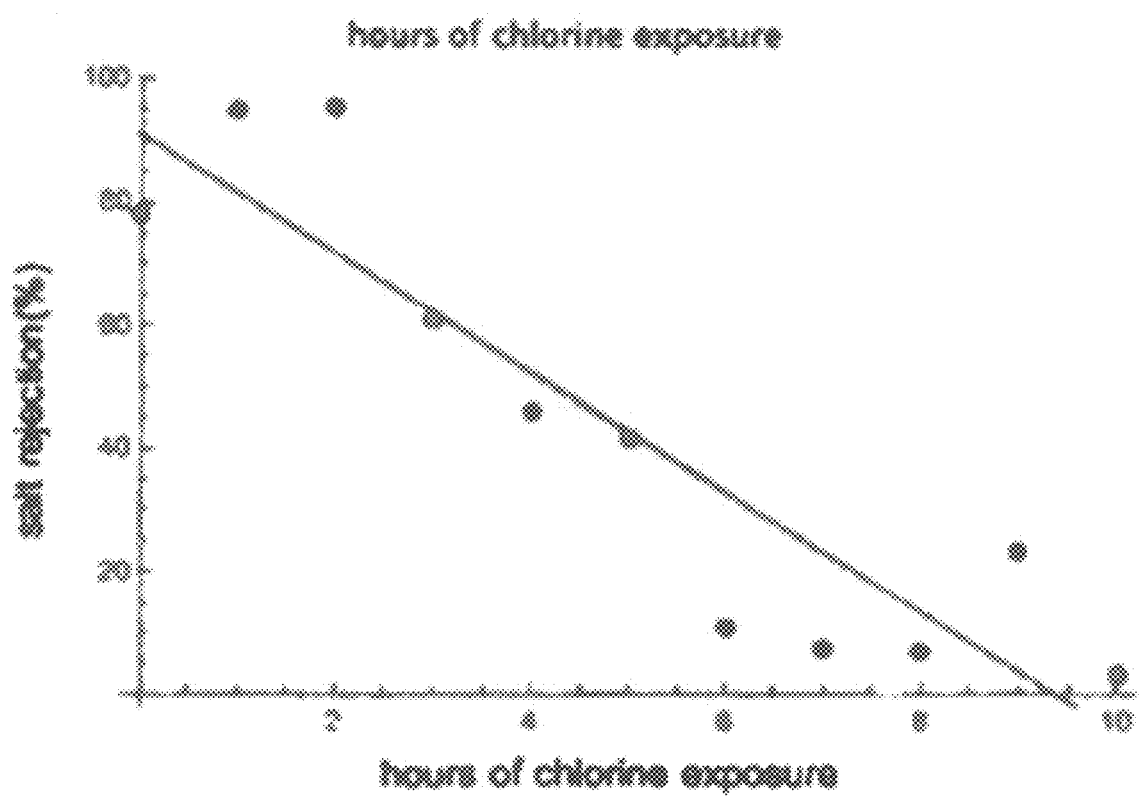
FIG. 20 is a graph of percent salt rejection versus hours of chlorine exposure for a polymer reverse osmosis membrane, according to one set of embodiments.

The membrane was also exposed to 4 ppm (drinking water standard) of free chlorine in the form of sodium hypochlorite for 24 hours and then assessed for rejection performance. A polymer RO membrane (Dow SWHR30)

showed no salt rejection upon exposure to 4 ppm chlorine for about 8 hours as shown in FIG. 20. In addition, a baseline comparison to methylene blue rejection was conducted. The polymer RO membrane demonstrated a 50% reduction in rejection, from 24% to 13%. The graphene oxide membrane actually increased rejection from 32% to 54%. Both membranes were run with MD for 1 hour under pressure before rejection was measured in order to account for adsorption to the membrane. The increase in rejection for the GO membrane could be attributed to a slower rate of adsorption due to the chlorine where some fraction of the rejection is due to adsorption.

Figure 21:
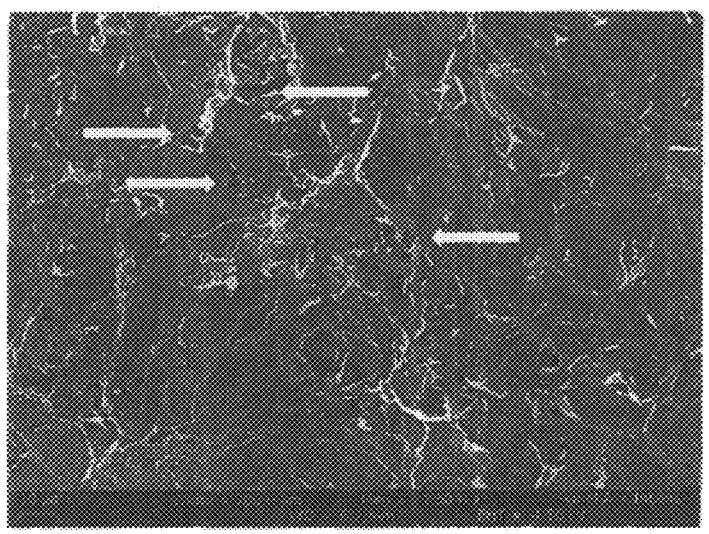
FIG. 21 is a scanning electron microscopy images of a graphene oxide membrane having defects, according to certain embodiments.

In order to achieve full coverage (no pinholes) of stable membranes (no cracks), vacuum filtration was used to deposit flakes immediately after amine addition with gentle stirring. FIG. 21 shows potential defects that were only revealed after the ethanol soak and contributed to no rejection in the permeate. Pinholes and cracks are among the defects that cause no rejection due to incomplete film formation. This and the other samples that were assembled using slow filtration tended to demonstrate larger defect features. The filtration volume, concentration, and cross-linker amount are critical to forming a membrane that is not too brittle but maintains planar flake deposition.

In summary, a way to reliably cross-link GO membranes in order to maintain sub-nanometer interlayer spacing that can be tuned to reject solutes from solution was developed. A 7-8 Å interlayer spacing was demonstrated, which translated into about 30% rejection of methylene blue and which has a hydrated diameter of 1.5 um. These results suggest that the degree of cross-linking and film assembly could be further optimized to ensure no swelling and increased rejection. In theory and in practice, the 7 Å spacing should be sufficient to reject hydrated sodium chloride ions, but larger pathways must be entirely eliminated. The opposing forces of degree of cross-linking and film coverage helped define the parameter space to evaluate here. Most importantly, chlorine did not appear to degrade the separation performance of the graphene oxide membrane, which provides an important performance parameter for their further development to reject salt.

Example 2

This example describes the compatibility of crosslinked graphene oxide membranes in various environments. Crosslinked graphene oxide membranes were found to be compatible with chlorinated solvents, elevated temperatures in aqueous solvents, elevated temperatures in nonpolar solvents, oxidizing agents, and high pHs.

Chemically durable linkers can be used to prepare durable graphene oxide membranes. For example, these graphene oxide membranes can be soaked overnight in pure dichloromethane (DCM). In contrast, commercial polyethersulfone membranes degrade immediately on contact with only a couple drops of DCM.

Figure 22:
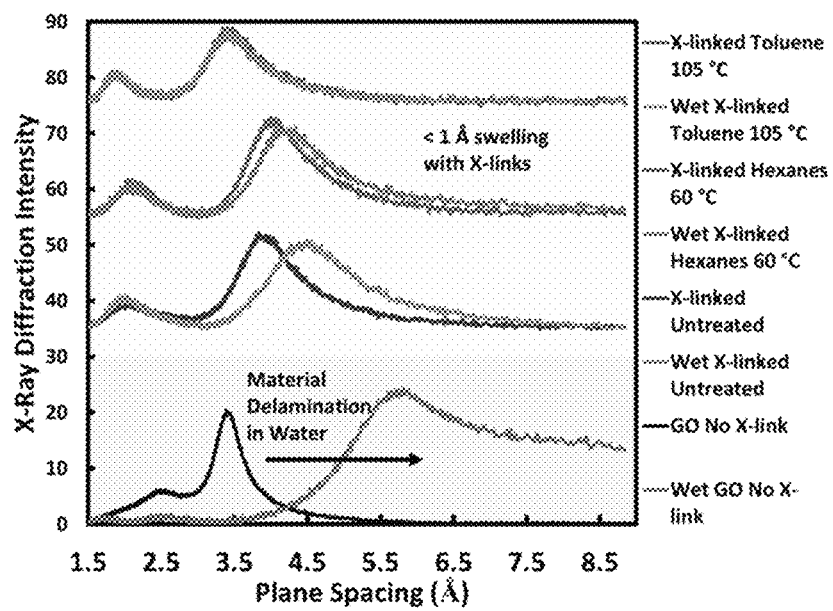
FIG. 22 is a graph of X-ray diffraction intensity versus plane spacing for crosslinked and non-crosslinked graphene oxide membranes under various conditions, according to one set of embodiments.

Even in water, today's polymer NF membranes are typically rated for 25° C. and report a maximum operating temperature of 50° C. However, the temperature and solvent tolerance of robustly crosslinked graphene oxide membranes were demonstrated at elevated temperature. Briefly, X-ray diffraction data was used to give the plane spacing between sheets of graphene oxide, which can be used to reject species of larger size as solvent or water flows between the layers. FIG. 22 shows films rinsed with water immediately before collection of a diffractogram. The uncrosslinked GO film swells extensively meaning no consistent rejection spacing and indicating loss of film integrity. In contrast, even after exposure to high temperature solvents hexane and toluene for 15 hours, the cross-link graphene oxide membranes swelled less than 1 Å indicating the effect of the layer cross-linker holding the flakes closely spaced.

Oxidizers are important cleaning agents for chemical, food processing, and pharmaceutical equipment. Chlorine and peroxides (if free chlorine is not desired) are the lowest cost and most effective sanitation chemical, but membrane processes today are unable to leverage this value. Even for water treatment, for which sanitation is immediately critical, water is chlorinated during pretreatment, de-chlorinated for the membrane steps (typically with sodium bisulfite) and then re-chlorinated before transmission into the municipal water supply. This additional step exists to protect the membranes. The membranes, which, despite all the pretreatment, still foul are then cleaned with hydrochloric acid or caustic washes, rather than chlorine. Polymer membrane manufacturers report limited tolerance (typically 20 ppm or 500 ppm hours over the entire membrane life) of peroxide and no tolerance to chlorine.

For higher fouling streams, cleanings occur much more frequently and must be more thorough. For example, dairy separations clean membranes as often as times 4 per day: once as mandated sanitation by the Food and Drug Administration (FDA) and three additional times in order to maintain sufficient permeate flow. Both chemical and pharmaceutical representatives express concern about such fouling and cleaning. Oxidizing agents such as peroxide and the free chlorine found in hypochlorite (bleach) would address this limitation.

Figure 23:
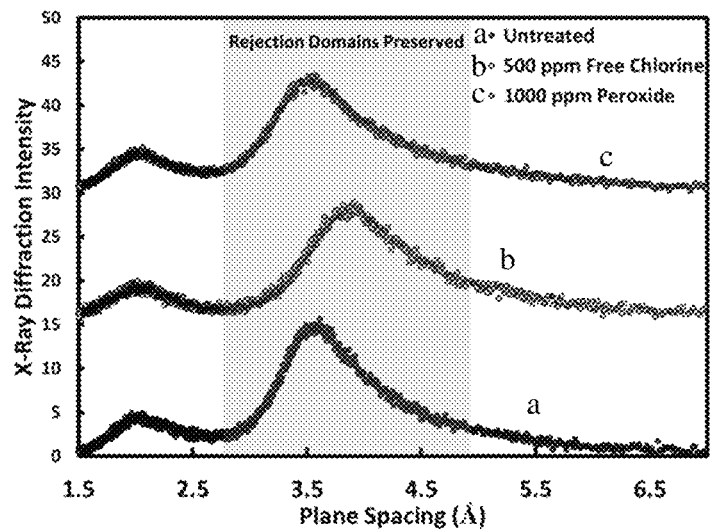
FIG. 23 is a graph of X-ray diffraction intensity versus plane spacing for crosslinked graphene oxide membranes in the presence of oxidizing agents, according to certain embodiments.

Again, by using a oxidation resistant chemical crosslinker (i.e., ester linkages) crosslinked graphene oxide membranes exposed to oxidation conditions overnight at concentrations well above the limit for most commercial polymer membranes showed preservation of the interlayer spacing and flake structure, indicating robustness to these chemical conditions, based on the X-ray diffraction data in FIG. 23.

Figure 24:
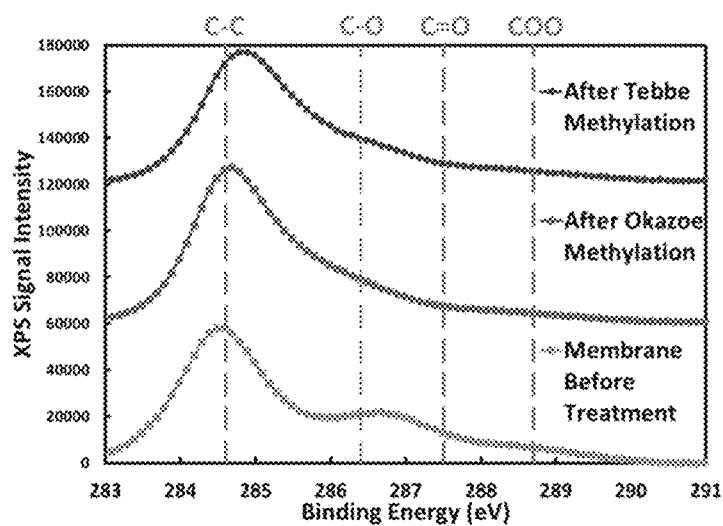
FIG. 24 is graph of X-ray photoelectron spectroscopy signal intensity versus binding energy for crosslinked graphene oxide membranes, according to one set of embodiments.
Figure 25:
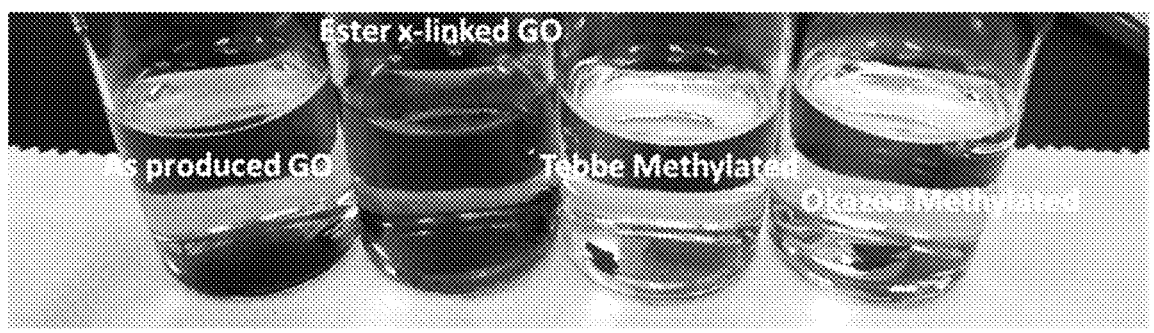
FIG. 25 is an image of a crosslinked graphene oxide membranes having various chemical linkages after exposure to certain conditions, according to certain embodiments.

Finally, to illustrate the pH tolerance of the membrane when the appropriate linkers are used, FIGS. 24 and 25 shows the conversion of an ester linker to an ether linker and the robustness of such films. As examples of available synthetic routes both Tebbe reagent and a Titanium-Zinc methylation approach developed by Okazoe can be used. The X-ray photoelectron (XPS) spectra, shown in FIG. 24, showed significant shifts of much of the C 1s signal intensity from binding energies corresponding to carbonyl structures to lower binding energies corresponding to single bonds to an oxygen atom. Specifically, XPS spectra showed reduction in carbonyl signal and preservation of ether linkages. Signal intensity corresponds to the ester x-linking groups decreases with some (likely residual acid groups) unchanged. The central peak from C—O and C=O structures shifted to lower energy showing the increase in singly bonded to oxygen carbon from the ether linkages as well as the methylation of any aldehydes and ketones present in the graphene oxide.

Membranes methylated by both approaches also showed resistance to delamination during sonication following overnight exposure to a pH 13 solution. Cross-linked membranes are resilient to sonication unlike graphene oxide. However, as shown in FIG. 25, after overnight exposure to high pH, ester crosslinks are severed and the film was again vulnerable to disruption via sonication. Methylated films by both the Tebbe and Okazoe methods did not disintegrate as the new ether linkages did not hydrolyze. FIG. 25 shows vials containing different graphene oxide membranes after overnight exposure to pH 13 solutions.

Thus, crosslinked graphene oxide membranes having broad compatibility can be formed.

Example 3

This example describes the highly crosslinked foam formed in Example 1 and shown in FIG. 14.

The highly crosslinked foam was formed by functionalizing GO sheets with acid chloride. Briefly, 20 mg of GO, 20 mL dimethylformamide, and 1 mL of oxalyl chloride were reacted for 4 hours. The resulting solution was dried of some hydrochloric acid byproduct by rotary evaporation for 30 min, and further diluted with 80 mL of DMF. 1 mL of $NEt_3$ was added while stirring to initiate crosslinking. After 3 min, mixture vacuum filtered through polyvinylidene fluoride or polytetrafluoroethylene filter and washed with methanol to remove residue and precipitate triethylammonium hydrochloride (white salt). The delaminated GO film had large pores.

Example 4

This prophetic example describes the formation of an amide linkage.

To form an amide chemical linkage, GO was chlorinated by exposure to excess trimethylsilyl chloride in dichloromethane. GO was washed and recovered. A SN2 reaction that converted the chlorides to secondary amines was performed by refluxing in the presence of excess methylamine. Oxalyl chloride and DMF were used to convert carboxylic acids to acid chlorides and following rotary evaporation, excess pyridine solution was used to deprotonate the amine functionalities in the graphene oxide sheet and trigger crosslinking.

Example 5

This example describes the formation of the ether linkage using the Tebbe method and using the following reagents: Zn, $TiCl_4$, and tetramethylethylenediamine (TMEDA).

For Tebbe's method, 2 mL of 0.5 M Tebbe in toluene was added to 12.5 mL of toluene at room temperature. The GO membrane was added to the solution. After 30 minutes, 12.5 mL of THF was added. After 3 hours, the mixture was quenched with 25 mL of 1 M NaOH over 10-20 minutes. The solution was decanted and the GO membrane was washed with 1 M HCl, water and ether.

For Zn, TiCl4, and TMEDA, 0.25 mL of $TiCl_4$ was carefully added to 2 mL of dichloromethane. 5 mL of THF was added dropwise. Then, 0.6 mL of TMEDA was added and stirred for 10 minutes. 0.3 g of Zinc dust was added and stirred for 30 minutes. 0.1 mL of dibutyl maleate was added followed immediately by the GO membrane. The mixture was stirred for 2 hours and then 1 mL of saturated $K_2CO_3$ (1.1 g/mL solution) was added over ice or slowly. The mixture was gently swirled for 15 minutes and then decanted and washed with 1 M HCl, water, and ether.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A membrane, comprising:
   crosslinked graphene oxide sheets, wherein a thickness of the membrane is greater than or equal to about 0.2 microns and a weight percentage of graphene oxide in the membrane is greater than or equal to about 70 wt. %.

2. The membrane of claim 1, wherein the crosslinked graphene oxide sheets are covalently crosslinked.

3. The membrane of claim 1, wherein an average d-spacing of the membrane is less than or equal to about 10 Å when saturated with water.

4. The membrane of claim 1, wherein a difference between an average d-spacing of the membrane when saturated with water and an average d-spacing of the membrane when dry is less than or equal to about 1 Å.

5. The membrane of claim 1, wherein the membrane has a thickness of greater than or equal to about 10 microns.

6. The membrane of claim 1, wherein a molecular weight cutoff of the membrane is greater than or equal to about 250 g/mol.

7. The membrane of claim 1, wherein the membrane is compatible with one or more oxidizing agents.

8. The membrane of claim 1, wherein the membrane is compatible with one or more chlorinated solvents.

9. The membrane of claim 1, wherein the membrane is compatible with one or more nonpolar solvents.

10. The membrane of claim 1, wherein the membrane has a maximum compatible pH of greater than or equal to about 9.

11. The membrane of claim 1, wherein the membrane has a minimum compatible pH of less than or equal to about 5.

12. The membrane of claim 1, wherein a maximum operating temperature of the membrane in water at pH 7 is greater than or equal to about 65° C. and less than or equal to about 300° C.

13. The membrane of claim 1, wherein a maximum operating temperature of the membrane in water at pH 7 is greater than or equal to about 100° C. and less than or equal to about 300° C.

14. The membrane of claim 1, further comprising a chemical linkage that attaches a graphene oxide sheet to an adjacent graphene oxide sheet, wherein the chemical linkage is of Formula I:

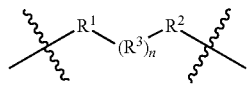

wherein:
$R^1$ is —C(O)—, —C(O)$_2$—, —O—, —S—, —N(R')—, —C(R')$_2$—, —C(=R')—, or a bond;
$R^2$ is —C(O)—, —C(O)$_2$—, —O—, —S—, —N(R')—, —C(R')$_2$—, or —C(=R')$_2$—, or a bond;
each $R^3$ is independently a bond, —O— or —N(R')—;
each R' is independently hydrogen, halide, hydroxyl, amine, or optionally substituted alkyl;
n is 1; and ⸨ indicates attachment to the backbone of a graphene oxide sheet.

15. The membrane of claim 14, wherein the chemical linkage is selected from:

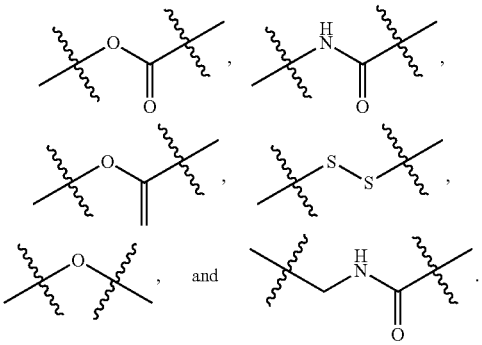

16. The membrane of claim 1, wherein a difference between an average d-spacing of the membrane when saturated with water and an average d-spacing of the membrane when dry is less than or equal to about 8 Å.

17. The membrane of claim 1, wherein the membrane is a free-standing membrane.

18. The membrane of claim 1, wherein the crosslinked graphene sheets are free-standing.

19. A membrane, comprising:
   a first graphene oxide sheet;
   a second graphene oxide sheet; and
   a chemical linkage that attaches the first graphene oxide sheet to the second graphene oxide sheet, wherein the chemical linkage is of Formula I:

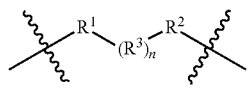

wherein:
$R^1$ is —C(O)—, —C(O)$_2$—, —O—, —S—, —N(R')—, —C(R')$_2$—, —C(=R')—, or a bond;
$R^2$ is —C(O)—, —C(O)$_2$—, —O—, —S—, —N(R')—, —C(R')$_2$—, or —C(=R')$_2$—, or a bond;
each $R^3$ is independently a bond, —O— or —N(R')—;
each R' is independently hydrogen, halide, hydroxyl, amine, or optionally substituted alkyl;

n is 1; and

 indicates attachment to the backbone of a graphene oxide sheet.

20. The membrane of claim 19, wherein the chemical linkage is selected from:

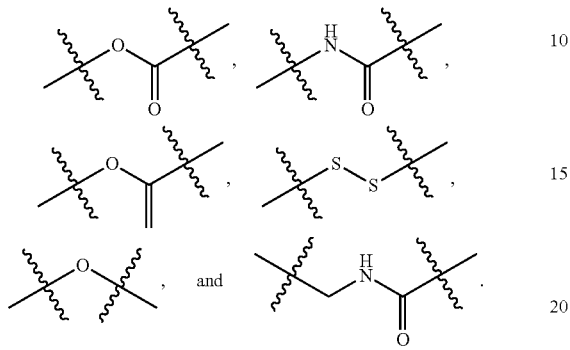

21. The membrane of claim 19, wherein a difference between an average d-spacing of the membrane when saturated with water and an average d-spacing of the membrane when dry is less than or equal to about 8 Å.

22. The membrane of claim 19, wherein a difference between an average d-spacing of the membrane when saturated with water and an average d-spacing of the membrane when dry is less than or equal to about 1 Å.

* * * * *